United States Patent
Fushimi et al.

(10) Patent No.: US 6,566,816 B2
(45) Date of Patent: May 20, 2003

(54) VEHICULAR LAMP CONTROL APPARATUS

(75) Inventors: Takehiko Fushimi, Aichi-ken (JP); Hiroshi Kajino, Aichi-ken (JP); Katsuyoshi Mizumoto, Mie-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/955,056

(22) Filed: Sep. 19, 2001

(65) Prior Publication Data

US 2002/0047533 A1 Apr. 25, 2002

(30) Foreign Application Priority Data

Sep. 19, 2000 (JP) ........................................ 2000-283364

(51) Int. Cl.[7] ................................................ B60Q 1/02
(52) U.S. Cl. ........................... 315/82; 315/83; 315/291; 315/307; 315/360; 307/10.8; 307/28; 307/29
(58) Field of Search ................................. 310/426, 642, 310/641, 635; 315/291, 307, 308, 77, 82, 86, 360, DIG. 4, 83, 80, 79; 340/815.4, 815.52, 815.68, 815.73, 660, 661, 662, 439, 441, 425.5, 449; 307/10.8, 10.1, 28, 29

(56) References Cited

U.S. PATENT DOCUMENTS

| | | | | |
|---|---|---|---|---|
| 3,879,617 A | * | 4/1975 | Faller | 307/10.8 |
| 4,684,819 A | * | 8/1987 | Haag et al. | 315/82 |
| 4,841,198 A | * | 6/1989 | Wilhelm | 315/82 |
| 5,021,727 A | | 6/1991 | Machino | 322/7 |
| 5,646,453 A | * | 7/1997 | Wetzel et al. | 307/10.1 |
| 5,680,098 A | * | 10/1997 | Bejster et al. | 340/458 |
| 5,821,700 A | * | 10/1998 | Malvaso | 315/291 |
| 6,307,330 B1 | * | 10/2001 | So | 315/291 |
| 6,455,951 B1 | * | 9/2002 | Shultz et al. | 307/10.1 |

* cited by examiner

Primary Examiner—Haissa Philogene
(74) Attorney, Agent, or Firm—Sughrue Mion, PLLC

(57) ABSTRACT

A plurality of lamps 21 to 28 inclusive are supplied with a voltage one after another in sequence. A time duration during which the voltage is supplied to each of the lamps 21 to 28 inclusive is controlled in PWM fashion to restrict an amount of voltage supplied thereto. A current detect circuit portion 36 solely detects all of the voltages supplied to the lamps 21 to 28 inclusive, respectively. Each of the voltages exceeds a threshold value, a dead band between two adjacent voltage supply durations. Thus, it is possible to restrict possible electromagnetic noises which are generated upon voltage supply to lamps 21 to 28 inclusive in a vehicular lamp control apparatus in which the lamps 21 to 28 inclusive are supplied with voltage from a high voltage battery 11.

3 Claims, 24 Drawing Sheets

(a) Low beam lamp (Right)
(b) Low beam lamp (Left)
(c) High beam lamp (Right)
(d) High beam lamp (Left)
(e) Fog lamp (Right)
(f) Fog lamp (Left)
(g) Hazard lamp (Right)
(h) Hazard lamp (Left)

Fig. 11
(a) Low beam lamp (Right) 
(b) Low beam lamp (Left) 
(c) Lamp current 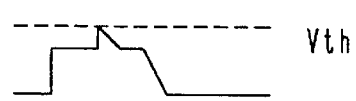 Vth (a) Low beam lamp (Right)
(b) Low beam lamp (Left)
(c) High beam lamp (Right)
(d) High beam lamp (Left)
(e) Fog lamp (Right)
(f) Fog lamp (Left)
(g) Hazard lamp (Right)
(h) Hazard lamp (Left)
(i) Lamp current (a) Low beam lamp (Right)
(b) Low beam lamp (Left)
(c) High beam lamp (Right)
(d) High beam lamp (Left)
(e) Fog lamp (Right)
(f) Fog lamp (Left)
(g) Hazard lamp (Right)
(h) Hazard lamp (Left)

(i) Lamp current (j) Lamp current

Fig. 17
(a) Low beam lamp 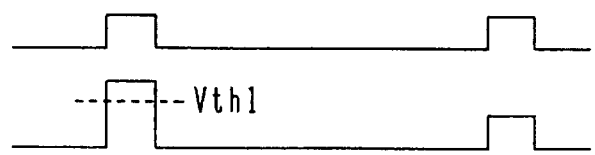
(b) Lamp current  Vth1

Eight lamps are lit.
(a) Low beam lamp(Right)
(b) Low beam lamp(Left)
(c) High beam lamp(Right)
(d) High beam lamp(Left)
(e) Fog lamp(Right)
(f) Fog lamp(Left)
(g) Hazard lamp(Right)
(h) Hazard lamp(Left)

Six lamps are lit.

(a) Low beam lamp (Right)
(b) Low beam lamp (Left)
(c) High beam lamp (Right)
(d) High beam lamp (Left)
(e) Fog lamp (Right)
(f) Fog lamp (Left)

60Hz
16.6mS
Max 16.6%

Fig. 23
(a) Low beam lamp (right) 
(b) Low beam lamp (left) 
(c) Lamp current 

VEHICULAR LAMP CONTROL APPARATUS

The present application is based on and claims priority under 35 U.S.C §119 with respect to Japanese Patent Application No. 2000-283364 filed on Sep. 19, 2000 AD (12th year of Heisei), the entire content of which is incorporated herein by reference.

FIELD OF THE INVENTION

The present invention is generally directed to a vehicular lamp control apparatus which feeds electric power (i.e. voltage) to one or more lamps from a high voltage battery.

BACKGROUND OF THE INVENTION

Recently, optional electrical equipment on vehicles and/or the vehicles per se are high-performance, which results in an increase of electric power consumed. Thus, the conventional inner-vehicle electric power system using a 12V battery is deficient in electric power supply. In addition, due to the increasing of the number of the aforementioned electrical components, an amount of current flowing through a harness becomes larger and larger which connects each of the electrical components and the battery, with the result that how to cope with the resultant or increased amount of heat generation becomes a serious problem.

One of the proposed solutions is to shift to a newly established rating which includes increasing the voltage of the battery to a higher value, for example, 36 volts.

If the higher-voltage battery is employed, the currently used lamps which operate on 12 volts cannot be lit by the conventional method.

SUMMARY OF THE INVENTION

The present invention has been developed to satisfy the request noted above and a first aspect of the present invention provides a vehicular lamp control apparatus which comprises a high voltage battery and a plurality of lamps, the lamps being supplied with voltages, respectively, from the high voltage battery one after another in periodic fashion, the voltage supplied to each of the lamps being controlled by adjusting a time duration during which each of the lamps is supplied with the corresponding voltage by PWM control, characterized in that all the voltage amounts are detected by a sole device, and when one of the voltage amounts exceeds a threshold value, a dead band is expanded which is defined between the corresponding time duration and a subsequent time duration. In accordance with the first aspect of the present invention, if the voltage amount to be supplied to the lamp exceeds the threshold value, the dead band is expanded which is defined between the corresponding time duration and the subsequent time duration. When the plural lamps are supplied with the voltages, respective, one after another in periodic fashion, sometimes an overlap may occur between a specific lamp and the subsequent lamp in voltage supply due to the delay action for the former, which results in a temporal increase of a total of the voltages supplied to the respective lamps. However, even if the voltage amount to be supplied to the lamp exceeds the threshold value, the dead band is expanded which is defined between the corresponding time duration and the subsequent time duration, thereby making the aforementioned overlap as short or small as possible. Thus, the aforementioned temporal voltage increase is restricted, which restricts the generation of a surge following a sudden change in supply voltage or current, thereby reducing the electromagnetic noise upon the electric power supply.

A second aspect of the present invention is to provide a vehicular lamp control apparatus which is a modification of the structure of the first aspect, wherein supplying the voltages to the respective lamps are made in different order for reducing the supply voltage amount variation. In accordance with the second aspect of the present invention, supplying the voltages to the respective lamps is made in a different order for reducing the supplying voltage amount variation. Correspondingly, the frequency of adjusting the voltage amount is made less, thereby reducing the surge as small as possible.

A third aspect of the present invention is to provide a vehicular lamp control apparatus which comprises a high voltage battery and a plurality of lamps, the lamps being supplied with voltages, respectively, from the high voltage battery one after another in periodic fashion, the voltage supplied to each of the lamps being controlled by adjusting a time duration during which each of the lamps is supplied with the corresponding voltage by PWM control, characterized in that the lamps are divided into two groups and if a malfunction is found in voltage supply in one group, the voltage supply is switched to the other group. In accordance with the third aspect of the present invention, even if a voltage supply malfunction is found at the lamp in one group, a timely or quick action can be taken by activating the normal lamp in the other group.

A fourth aspect of the present invention is to provide a vehicular lamp control apparatus which comprises a high voltage battery and a plurality of lamps, the lamps being supplied with voltages, respectively, from the high voltage battery in periodic fashion, the voltage supplied to each of the lamps being controlled by adjusting a time duration during which each of the lamps is supplied with the corresponding voltage by PWM control, characterized in that when an automatic engine stop control becomes active the time duration for the lamp is gradually decreased and/or when an automatic engine start control becomes active the time duration for the lamp is drastically increased. In accordance with the fourth aspect of the present invention, when the automatic engine stop control becomes active, the time duration during which the lamp is being supplied with the voltage is gradually decreased, thereby making the lamp darken gradually and naturally and restricting the consumed electric power. In addition, when the automatic engine start control becomes active, the time duration during which the lamp is being supplied with the voltage is drastically increased, thereby ensuring the required illumination of the lamp when the vehicle begins to start.

A fifth aspect of the present invention is to provide a vehicular lamp control apparatus which comprises a high voltage battery and a plurality of lamps, the lamps being supplied with voltages, respectively, from the high voltage battery in periodic fashion, an amount of the voltage supplied to each of the lamps being controlled by adjusting a time duration during which each of the lamps is supplied with the corresponding voltage by PWM control, characterized in that the time duration is corrected to increase or decrease on the basis of at least one of ambient brightness, a vehicle speed, and a voltage of the high voltage battery. In accordance with the fifth aspect of the present invention, if the time duration during which the lamp is being supplied with the voltage is corrected to increase or decrease on the basis of the ambient brightness, for example, when the ambient brightness is light, making the time duration during which the lamp is being applied with the voltage shorter correspondingly brings in the restriction in consumed electric power without disturbing eyesight. In addition, if the time duration during which the lamp is being supplied with the voltage is corrected to increase or decrease on the basis of the vehicle speed, for example, when the vehicle speed is slow, making the time duration during which the lamp is being supplied with the voltage shorter correspondingly brings in a restriction in consumed electric power. Moreover, if the time duration during which the lamp is being supplied with the voltage is corrected to increase or decrease on the basis of the voltage battery, for example, when the voltage battery is low, making the time duration during which the lamp is being supplied with the voltage longer correspondingly ensures the required illumination of the lamp.

A sixth aspect of the present invention is to provide a vehicular lamp control apparatus which comprises a high voltage battery and a plurality of lamps, the lamps being supplied with voltages, respectively, from the high voltage battery in periodic fashion, an amount of the voltage supplied to each of the lamps being controlled by adjusting a time duration during which each of the lamps is supplied with the corresponding voltage by PWM control, characterized in that there is provided communication means receiving identification information transmitted from a mobile communication device and detecting whether or not the received identification information is in coincidence with pre-stored owner's identification information, and the voltage supply to the lamp is initiated in a predetermined manner when the received identification is found to be in coincidence with the pre-stored owner's identification information, even if an ignition switch is OFF. In accordance with the sixth aspect of the present invention, when the identification information transmitted from the mobile communication device is found to be in coincidence with the prestored owner's identification information even if the ignition key is OFF, the voltage supply to the lamp is initiated in the predetermined manner. Thus, in a large parking area, sending the identification information from the mobile communication device to the communication means causes the lamps to flash on-and-off, which makes it possible to recognize easily where the vehicle is parked.

A seventh aspect of the present invention is to provide a vehicular lamp control apparatus which comprises a high voltage battery and a plurality of lamps, the lamps being supplied with voltages, respectively, from the high voltage battery in periodic fashion, an amount of the voltage supplied to each of the lamps being controlled by adjusting a time duration during which each of the lamps is supplied with the corresponding voltage by PWM control, characterized in that there is provided theft detection means for detecting whether or not the vehicle is in danger of theft the voltage supply to the lamp is initiated when the vehicle is found to be in danger of theft, even if the ignition switch is OFF. In accordance with the seventh aspect of the present invention, when the vehicle is found to be in danger of theft, even if the ignition key is OFF, the voltage supply to the lamp is initiated in the predetermined manner, which causes the lamps to flash on-and-off, thereby making it possible to inform everyone that the vehicle is being in danger of theft or being stolen.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which:

FIG. 10 and FIG. 11 are other time charts when the lamp control apparatus in accordance with the first embodiment operates;

FIG. 17 illustrates a time chart of voltage supply to each of the lamps when the lamp control apparatus in accordance with the fourth embodiment operates;

FIG. 23 is a time chart of voltage supply to each of the lamps when the lamp control apparatus is operated whose circuit is illustrated in FIG. 22.

DETAILED DESCRIPTION OF THE INVENTION

Hereinafter, preferable embodiments of a vehicular lamp control apparatus in accordance with the present invention will be described, in detail, with reference to the attached drawings.

First Embodiment

First of all, referring to FIGS. 1 to 11 inclusive, there is illustrated a vehicular lamp control apparatus in accordance with a first embodiment of the present invention.

Figure 1:
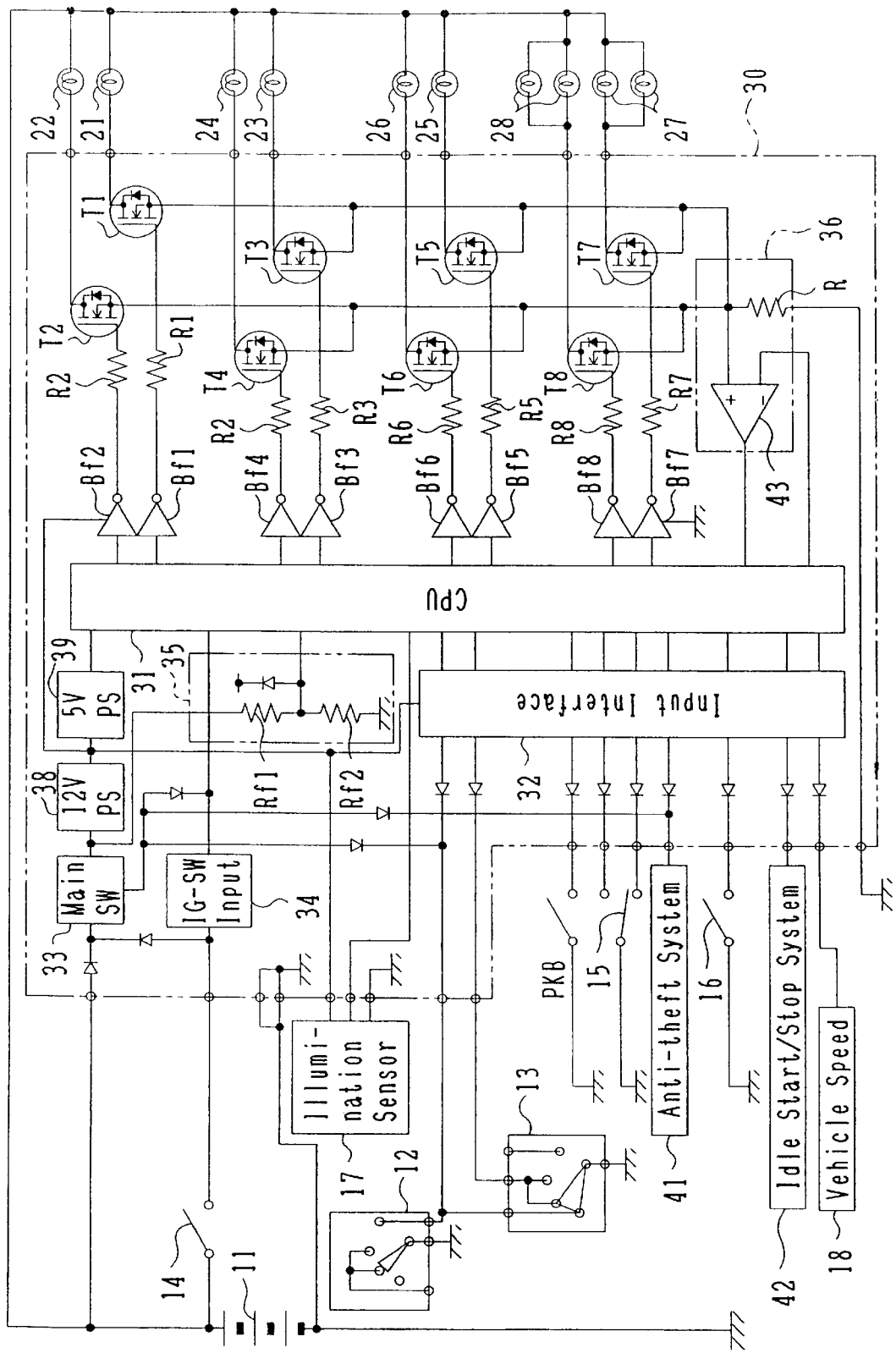
FIG. 1 illustrates an electric circuit diagram of a first embodiment of a vehicular lamp control apparatus in accordance with the present invention.

As can be seen from FIG. 1, which is an electric circuit diagram of the vehicular lamp control apparatus in accordance with the present embodiment, a battery 11 of as high as 36 volts powers the present vehicular lamp control apparatus. The vehicular lamp control apparatus includes a light control switch 12, a dimmer switch 13, an ignition switch 14, a direction indication switch 15, a fog lamp switch 16, an illumination sensor 17, a vehicle speed sensor 18, a right-side low beam lamp 21, a left-side low beam lamp 22, a right-side high beam lamp 23, a left-side high beam lamp 24, a right-side fog lamp 25, a left-side fog lamp 26, a right-side hazard lamp 27, a left-side hazard lamp 28, and a controller 30. The lamps 21 to 28 inclusive are controlled, by the controller 30, to turn on or off, on the basis of conditions of the switches 12 through 16 and sensors 17 and 18. It is to be noted that the lamps 21 to 28 inclusive currently specify lamps which operate on 12 volts despite the current supply of 36 volts from the battery 11 to the lamps 21 to 28 inclusive.

The light control switch 12, upon manipulation thereof by a driver or another person, turns on or off headlights such as the low beam lamps 21 and 22 and the high beam lamps 23 and 24. The dimmer switch 13 serves for, in particular, turning on or off the high beam lamps 23 and 24.

The illumination sensor 17, which serves for detecting a neighboring or ambient brightness, is mounted, for detecting a neighboring or ambient brightness. The vehicle speed sensor 18 is fixedly connected, for example, to a rear end portion of a transmission output shaft (not shown) and determines a vehicle speed on the basis of rotation numbers of the transmission output shaft.

The controller 30 is made up of a CPU (i.e. Central Processing Unit) 31, an input interface 32, output buffers Bf1 through Bf8, switching transistors T1 through T8, a main switch 33, an ignition switch input circuit portion 34 which determines whether the ignition switch 14 is turned on or off, a voltage detection circuit portion 35, a current detection portion 36, a 12 volt power supply 38, a 5 volt power supply 39, and other elements.

The ignition switch input circuit portion 34 is coupled to the CPU 31, which results in that either of ON and OFF states of the ignition switch 14 is fed or inputted to the CPU 31.

The voltage detection circuit portion 35 includes a first resistor Rf1 whose one end is connected to the high voltage battery 11 and a second resistor Rf2. One end of the second resistor Rf2 is connected in series to the other end of the first resistor Rf1, while the other end of the second resistor Rf2 is grounded. A connecting portion at which the first resistor Rf1 and the second resistor Rf2 are connected to each other is connected to the CPU 31. The CPU 31 is supplied with a voltage whose amount is obtained by dividing the voltage (36 volts) of the high voltage batter 11 by a voltage divider consisting of the in-series resistors Rf1 and Rf2.

The illumination sensor 17 is connected to the CPU 31 to feed a voltage generated at the illumination sensor 17 which depends on the degree of the ambient brightness. The light control switch 12, the dimmer switch 13, the direction indication switch 15, the fog lamp switch 16, and the vehicle speed sensor 18 are connected, by way of the input interface 32, to the CPU 31 to input current condition or state of each of these elements.

The vehicle on which the present vehicular lamp control apparatus is mounted is provided with an anti-theft system 41 and a mode signal which is representative of whether the vehicle has been stolen or not is fed to the CPU 31 by way of the input interface 32. It is to be noted that the anti-theft system 41 is well known and operates to detect an illegal access to the vehicle in such a manner that inside the vehicle an ultrasonic sound field is generated and a cause, such as breakage of a vehicular window glass or unlawful entrance into the vehicle, which varies the ultra-sonic sound field is regarded as being theft.

In addition, the vehicle on which the present vehicular lamp control apparatus is provided is also provided with an idle start/stop system 42. The idle start/stop system 42 performs automatic control for stopping and starting an engine (not shown) on the basis of engine stop and engine start states, respectively. The engine stop state can be known or detected by the vehicle speed sensor 18, while the engine start state can be known by, for example, a depression of an acceleration pedal (not shown) while the engine is at rest. The idle start/stop system 42 feeds a mode signal, by way of the input interface 32, to the CPU 31 which is indicative of whether or not the engine is under automatic control.

Drains of the switching transistors T1 through T8 are connected to the lamps 21 through 28 which are connected to a positive terminal of the high voltage battery 11. Sources of the switching transistors T1 through T8 are grounded by way of the current detection circuit portion 36. In addition, gates of the switching transistors T1 through T8 are connected to the CPU 31 by way of the resistors R1 through R8 and the output buffers Bf1 through Bf8, respectively. Thus, when a driving signal is issued or outputted from the CPU 31 to one of the gates of the switching transistors T1 through T8 by way of the corresponding in-series set of the buffers and the resistor, one of the switching transistors T1 through T8 is turned on or made ON, which causes a current to flow through the corresponding lamp, thereby energizing the same. On the basis of a time duration during which the driving signal is being issued from the CPU 31, if a PWM control is performed with respect to a time duration during which the current flows through the energized lamp, the illumination degree of the energized lamp can be adjusted.

The current detection circuit portion 36 includes an operational amplifier 43 and a resistor R. The gates of all the switching transistors T1 through T8 are grounded by way of the resistor R. The source side of the resistor R is also connected to the CPU 31 by way of the operational amplifier 43. Due to the fact that the current flowing through the lamp also flows through the resistor R, a voltage is generated across the resistor R. The resultant voltage across the resistor R is fed to the CPU 31 by way of the operational amplifier 43 to make it possible to indicate the current flowing through each of the lamps 21 through 28 as a voltage value.

Figure 2:
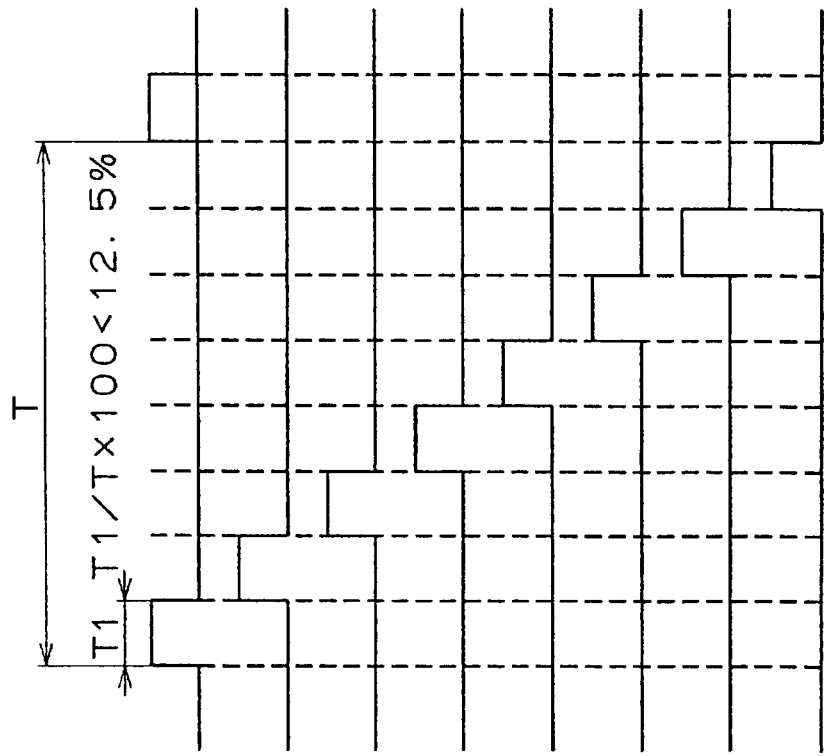
FIG. 2 illustrates a time chart of voltage supply to each of the lamps when the lamp control apparatus in accordance with the first embodiment operates.

Basic lamp control modes in the present embodiment will be explained with reference to FIG. 2. In the present embodiment, the voltage is supplied from the high voltage battery 11 to the lamps 21 through 28 at a period of, for example, 60 cycles, resulting in that the cycle T is about 16.6 ($=\frac{1}{60} \times 10000$)[ms]. Due to the fact that lamps 21 through 28 are supplied with the voltage one after another i.e. intertemporally), a time duration of about 2.1 ($=^{16.6}/_8$)[ms] is set between voltage supply starting timings of two lamps which are to be turned one after another. An upper limit of each voltage supply duration is set to about 2.1[ms] which is equivalent to 12% (i.e. $\frac{1}{8} \times 100 = 12.5$) of the above-mentioned cycle T (i.e. $\frac{1}{8} \times 100 = 12.5$). Moreover, in order to set or define a dead band between two adjacent voltage supply durations, the criteria of each of the voltage supply durations is set to about 1.8[ms] which is equivalent to 1%

(i.e. ⅕×100) of the above-mentioned cycle T. Thus, the voltage supply duration T1 for each of the lamps 21 through 28 is adjusted (increased or decreased) by PWM control to be within a range between the criteria (1.8[ms]) and the upper limit (2.1[ms]), thereby restricting the voltage supply to the lamps 21 through 28.

It is to be noted the voltage supply is made in the order of the right-side low beam lamp 21, the left-side low beam lamp 22, the right-side high beam lamp 23, the left-side high beam lamp 24, the right-side fog lamp 25, the left-side fog lamp 26, the right-side hazard lamp 27, and the left-side hazard lamp 28.

Hereinafter, with reference to FIGS. 3 to 11 inclusive, the contents of the processing performed by the controller 30 will be described in great detail as well as how the vehicular lamp controller apparatus operates in accordance with the first embodiment of the present invention.

Figure 3:
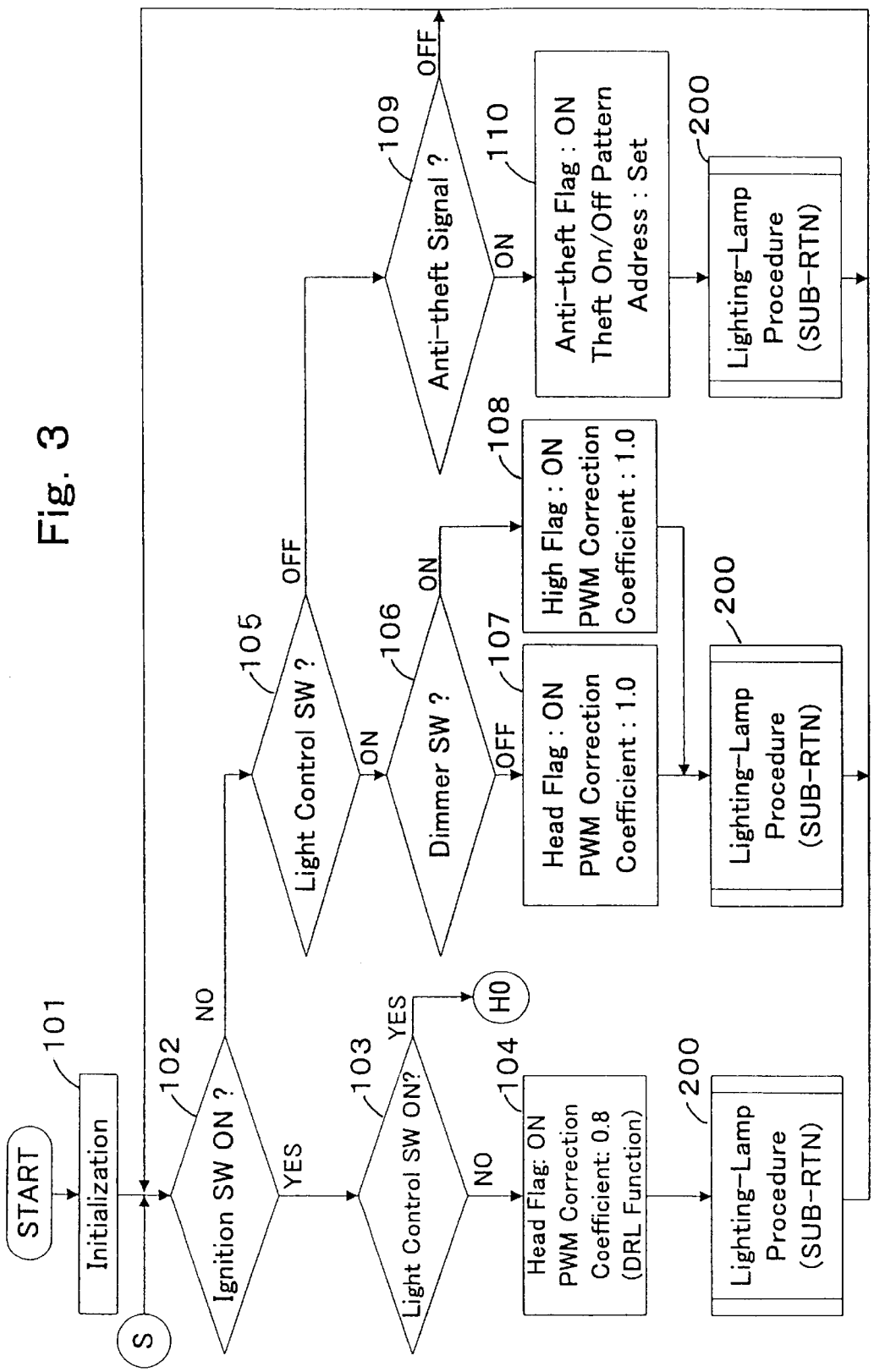
FIG. 3, FIG. 4a and FIG. 4b are schematic illustrations, in flowchart format, of the control of the lamp control apparatus in accordance with the first embodiment.
Figure 4A:
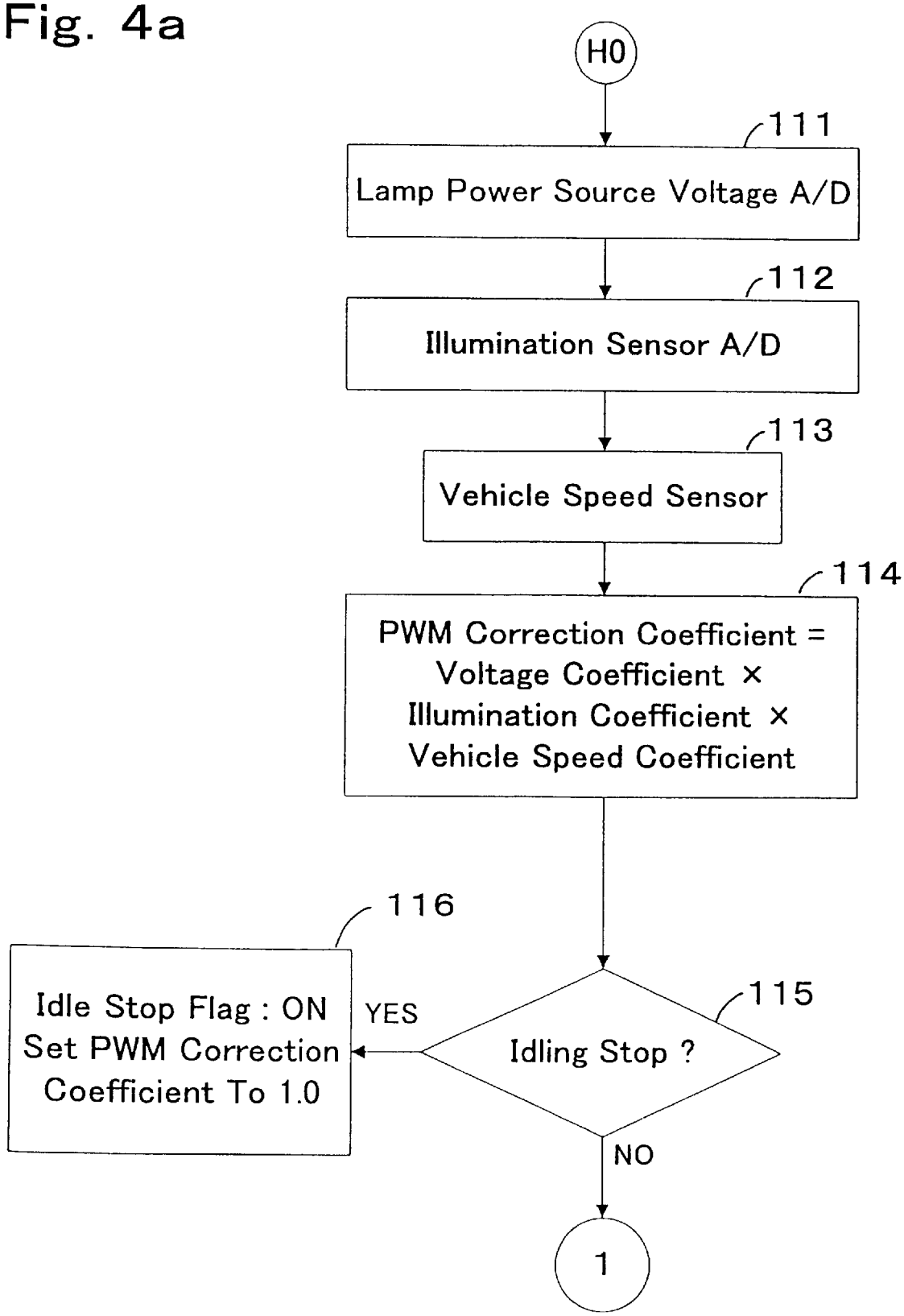
Figure 4B:
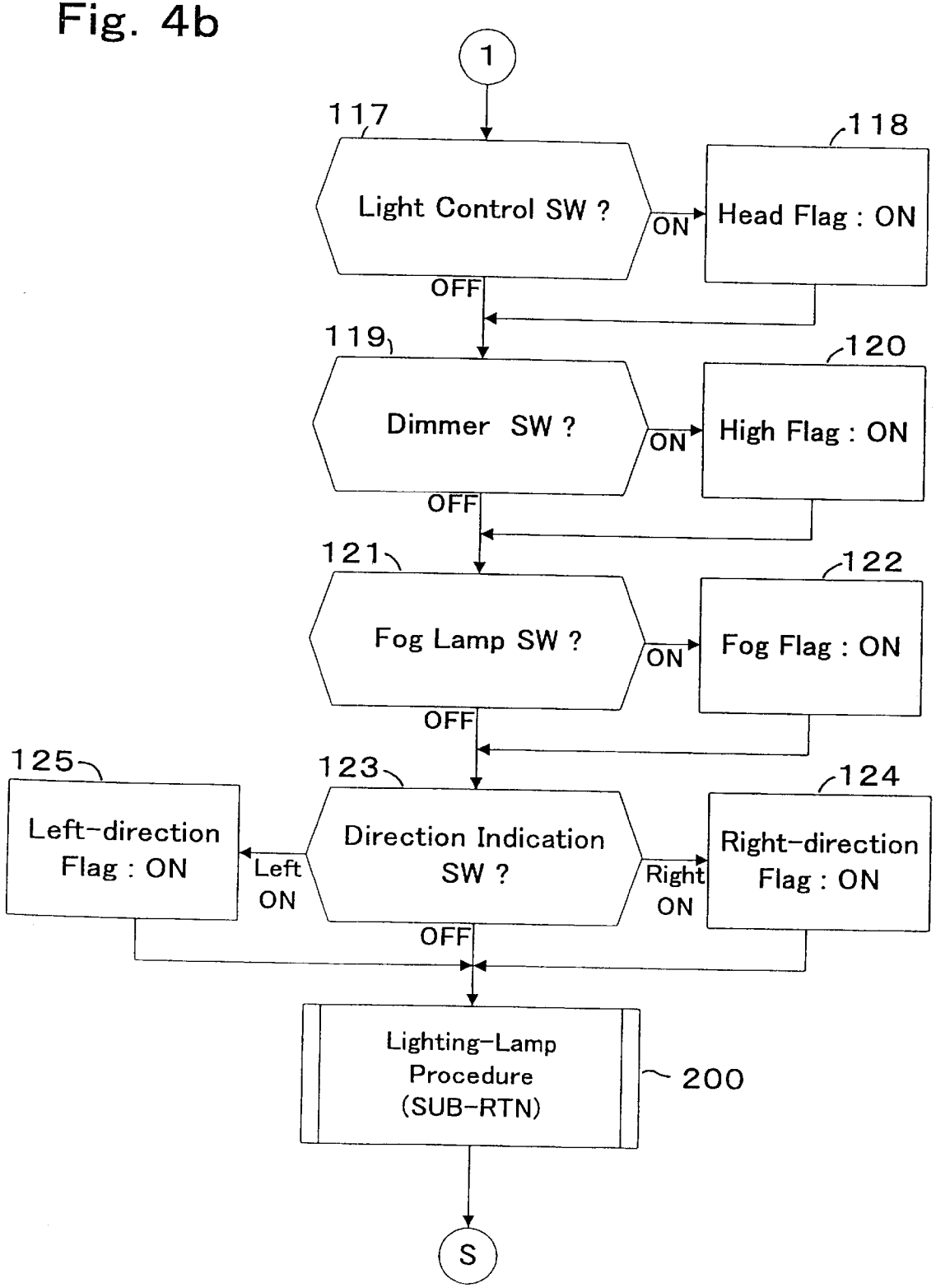

In a program routine which is indicated in the form of flowchart in FIG. 3, first of all, the CPU 31 performs an initialization at step 101 and thereafter repeats subsequent step 102 every time when a fixed time interruption occurs.

At step 102, the CPU 31 determines whether or not the ignition switch 14 is turned on. If the result is yes (i.e. the ignition switch 14 is turned on), the CPU 31 goes to step 103 to determine whether or not the light control switch 12 is turned on. If the result is no (i.e. the light control switch 12 is turned off), the CPU 31 goes to step 104 to set a head flag (i.e. to make the head flag ON) and make a PWM correction coefficient 0.8 (i.e. the PWM correction coefficient is set to be 0.8. Then, the CPU 31 performs step 200 as a subroutine for lamp lighting processing as will be detailed later, and returns to step 102. It is to be noted that whenever the low beam lamp 21 and/or the low beam lamp 22 are lit the head flag is set. The PWM correction coefficient is used to control (i.e. increase or decrease) the voltage supply duration by being multiplied with the aforementioned criteria of lamp voltage supply duration (1.8[ms]). Such a setting of the voltage supply duration while the light control switch is being turned off is intended to comply with Canada's statutory regulation i.e. DRL (Daytime Running Light) which requires each of the low beam lamps 21 and 22 to illuminate such that the daytime illumination degree of the low beam lamp is about 80% of the full-illumination degree thereof.

Figure 5:
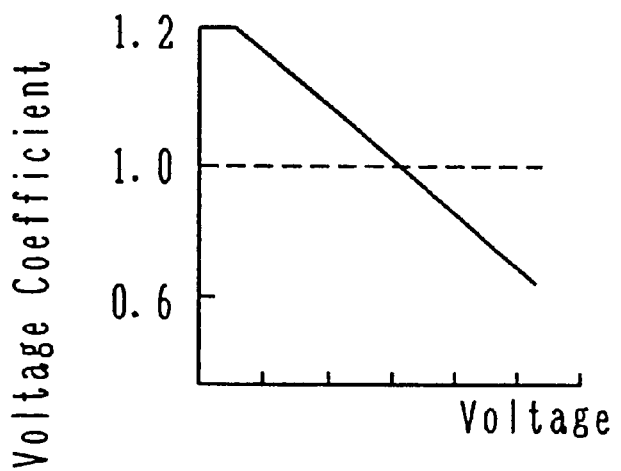
FIG. 5 illustrates a graph which is representative of a relationship between battery voltage and voltage coefficient.
Figure 6:
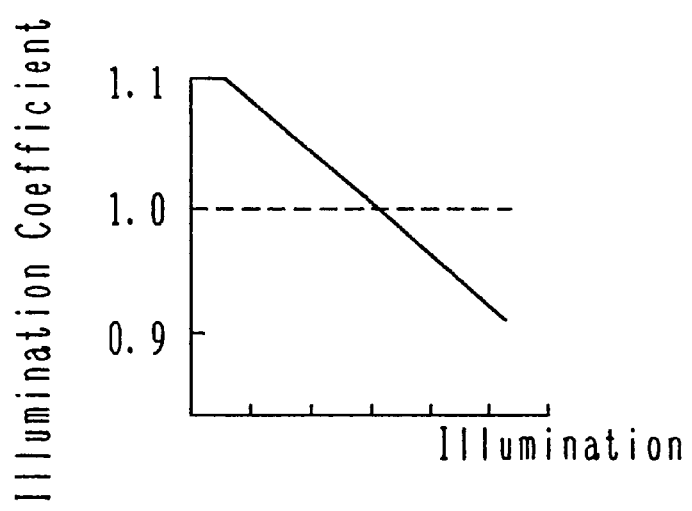
FIG. 6 illustrates a graph which is representative of a relationship between illumination and illumination coefficient.

On the other hand, at step 103, if the light control switch 12 is found to be turned on or lit, the CPU 31 goes to step 111 (FIG. 4a) to calculate a voltage coefficient to be used for calculating the PWM correction coefficient on the basis of the voltage of the high voltage battery 11 which is detected at the voltage detect circuit portion 35. As shown in FIG. 5, the voltage coefficient is set to be larger as the voltage of the high voltage battery 11 is made smaller. The reason is that the voltage supply duration for the lamp (setting the PWM correction coefficient larger) has to be extended or made longer for compensating the decrease in the amount of voltage supplied to the lamp which results from the voltage drop of the high voltage battery 11.

Figure 7:
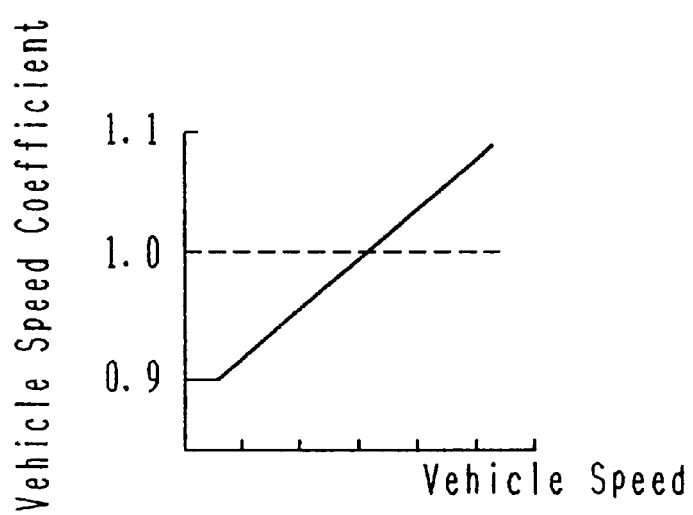
FIG. 7 illustrates a graph which is representative of a relationship between vehicle speed and vehicle speed coefficient.
Figure 8:
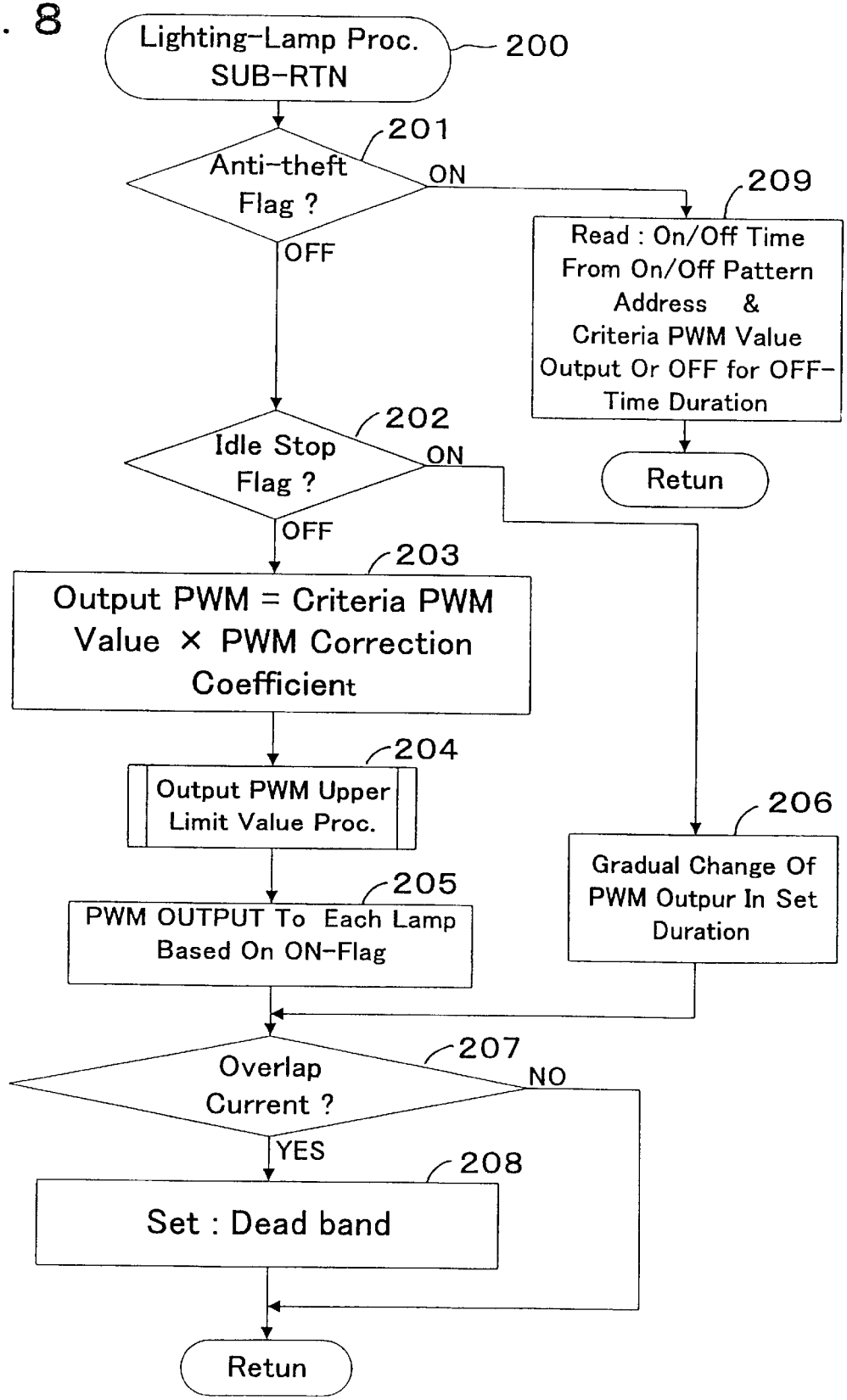
FIG. 8 is another schematic illustration, in flowchart format, of the control of the lamp control apparatus in accordance with the first embodiment.

Thereafter, the CPU 31 goes to step 113 to calculate a vehicle speed coefficient to be used for calculating the PWM correction coefficient on the basis of the vehicle speed which is detected by the vehicle speed sensor 18. As shown in FIG. 7, the vehicle speed coefficient is set to be smaller as the vehicle speed is made smaller. The reason is to make the voltage supply duration for the lamp shorter (i.e. to make the PWM correction coefficient smaller) in order to restrict the power consumption of the high voltage battery 11 while the vehicle travels or runs at lower speeds.

Thereafter, the CPU 31 goes to step 114 to calculate a current PWM correction coefficient by multiplying the voltage coefficient, the illumination coefficient, and the vehicle speed coefficient which have been calculated at steps 111, 112, and 113, respectively. Thus, such a current PWM correction coefficient is preferable in view of the voltage of the high voltage battery 11, the ambient brightness, and the vehicle speed.

The CPU 31, after the calculation of the PWM correction coefficient, goes to step 115 to determine whether or not the idle stop state is established. The establishment of the idle stop state is determined when the mode signal which is indicative of the automatic stop control condition is received from the idle start/stop system 42. At this time, if the idle stop state is found to be established, the CPU 31 goes to step 116 to rest the idle stop flag (i.e. make the idle stop flag OFF), set the PWM correction coefficient to 1.0 again, and goes to step 117. On the other hand, if the idle stop state is not found to be established, the CPU 31 goes to step 117.

At step 117, the CPU 31 judges whether or not the light control switch 12 is turned on. If the switch 12 is on, the CPU 31 goes to step 118 to make the head flag ON and goes to step 119. If the light control switch 12 is found to be turned off, the CPU 31 goes to step 119. At step 119, the CPU 31 judges whether or not the dimmer switch 13 is turned on. If the switch 13 is on, the CPU 31 goes to step 120 to make the high flag ON and goes to step 121. If the dimmer switch 13 is found to be turned off, the CPU 31 goes to step 121. It is to be noted that the high flag is made ON when the high beam lamps 23 and 24 are lit.

At step 121, the CPU 31 judges whether or not the fog lamp switch 16 is turned on. If the switch 16 is on, the CPU 31 goes to step 122 to make the fog flag ON and goes to step 123. If the fog lamp switch 16 is found to be turned off, the CPU 31 goes to step 123. It is to be noted that the fog flag is made ON when the fog lamps 25 and 26 are lit.

At step 123, the CPU 31 judges whether the direction indication switch 15 is turned on for either of RIGHT and LEFT. If the direction indication switch 15 is found to be turned on for RIGHT, the CPU 31 goes to step 124 to make the right-direction flag ON, executes a lighting-lamp subroutine at step 200, and returns to step 102 (FIG. 3). If the direction indication switch 15 is found to be turned on for LEFT, the CPU 31 goes to step 125 to make the left-direction flag ON, executes the lighting-lamp subroutine at step 200, and returns to step 102 (FIG. 3). On the other hand, if the direction indication switch 15 is found to be turned off, the CPU 31 executes the lighting-lamp subroutine at step 200, and returns to step 102 (FIG. 3). It is to be noted that the right-direction flag and the left-direction flag are made ON when the right hazard lamp 27 and the left hazard lamp 28 are lit, respectively.

At step 102, if the ignition switch 14 is found turned off, the CPU 31 goes to step 105 to judge whether or not the light control switch 12 is turned on. If the switch 105 is on, the CPU 31 goes to step 106 to check whether or not the dimmer switch 13 is turned on. If the switch 13 is off, the CPU 31 makes the head flag ON, sets the PWM coefficient to 1.0, executes the lighting-lamp subroutine at step 200, and goes back to step 102. If the dimmer switch 13 is found turned on at step 106, the CPU 31 makes the high flag ON, executes the lighting-lamp subroutine at step 200, and goes back to step 102.

If the light control switch 12 is found turned off at step 105, the CPU 31 goes to step 109 to check whether or not the anti-theft signal is inputted. This anti-theft signal is the previously mentioned mode signal which is outputted from the anti-theft system 41 for the indication of the vehicle theft state. If the anti-theft signal is found inputted, the CPU 31 goes to step 110 to make the anti-theft flag ON and set a theft on/off pattern. In detail, an on/off time is set in an address which turns on and off the lamps 21 through 28 in a predetermined pattern such that for example the lamps 21 through 22 are intermittently lit for the indication of SOS. This pattern is stored in a flash memory (not shown) which is built or housed in the CPU 31. Thereafter, the CPU 31 executes the lighting-lamp subroutine and goes back to step 102. If the anti-theft signal is not found inputted at step 109, the CPU 31 goes back to step 102.

Next, the lighting-lamp subroutine executed at step 200 will be explained in great detail with reference to FIGS. 8 to 11 inclusive. The CPU 31, which begins to execute the lighting-lamp subroutine, first of all, judges whether or not the anti-theft flag is ON. If the result is OFF, the CPU 31 goes to step 202 to check whether or not the idle stop flag is ON. If the result is OFF, the CPU 31 goes to step 203 to calculate an output PWM by multiplying the value of criteria PWM with the PWM correction coefficient. This criteria PWM is a criteria (1.8 ms) of time duration during which each of the lamps 21 through 28 is powered with electricity and is used, when being multiplied with the PWM coefficient, to obtain the output PWM which is indicative of a temporal powering time duration (i.e. voltage supply time duration) for each of the lamps 21 through 28.

The CPU 31, which has finished calculating the temporal output PWM, goes to step 204 to execute an output PWM upper limit procedure. In detail, the calculated output PWM at step 203 is compared to the upper limit (2.1 ms) of the voltage supply time duration for each of the lamps 21 through 28. If the output PWM is not less than the voltage supply time duration for each of the lamps 21 through 28, the output PWM is, as it is, set as an ultimate output PWM. If not, the upper limit of the voltage supply time duration is used as the ultimate output PWM. This output PWM upper limit procedure is intended to prevent an overlap between one of the voltage supply time duration and its next the voltage supply time duration when the former becomes longer. The CPU 31, which has finished executing this output PWM upper limit procedure, goes to step 205 to output the PWM output to one or more of the lamps 21 through 28 on the basis of one or more of the flags which are made ON and goes to step 207.

Figure 9:
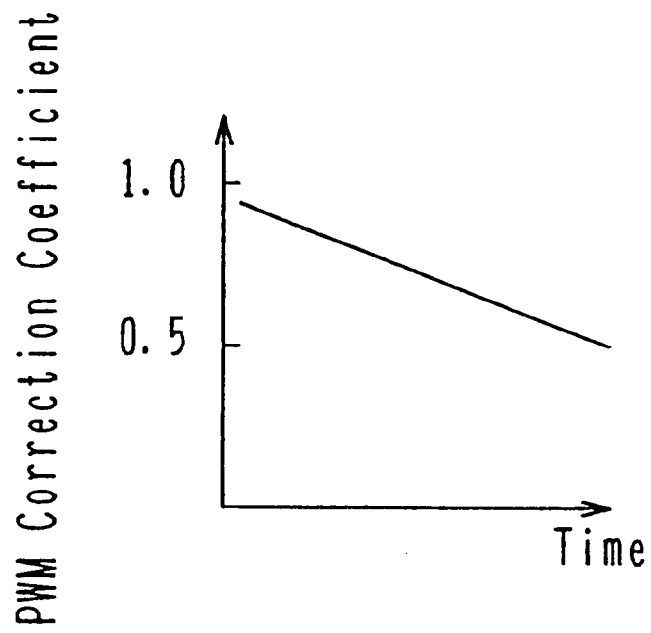
FIG. 9 illustrates a graph which is representative of a relationship between time passing and PWM correction coefficient.

At step 202, if the idle stop flag is found ON, the CPU 31 goes to step 206 to vary the output PWM gradually in a set duration. In detail, the output PWM is calculated by multiplying the value of criteria of PWM with the PWM correction coefficient (−1.0) which are set at step 116 and changes as shown in FIG. 9 the resultant output PWM in such a manner that whenever the calculation is made (i.e. with the passing of time) the PWM correction coefficient is decreased to, for example, as minimum as 0.5. Such a correction is intended to decrease the voltage supply time duration to the lamp in gradual fashion in the engine automatic stop control i.e. to make the lamp dimmer in gradual fashion for making the consumption of the high voltage battery as small as possible. If the engine automatic start control is initiated, of course, the idle stop flag is made OFF, which cause the execution of steps 203 to 205 inclusive, resulting in voltage supply to each of the lamps 21 through 28, thereby increasing the illumination of each of the lamps 21 through 28 suddenly or quickly.

Figure 10:
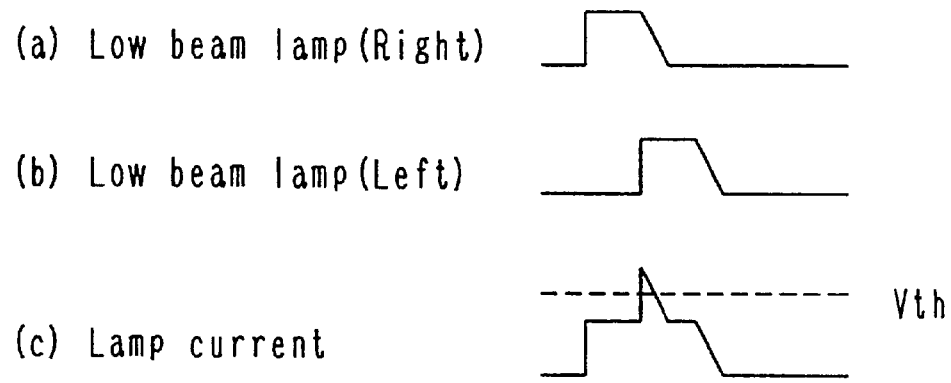

The CPU 31, which has finished executing step 205 or 206, goes to step 207 to check whether or not an overlap current is found. With respect to the overlap current, an explanation is made with reference to a time chart depicted in FIG. 10. FIG. 10 exemplarily shows that the low beam 21 and the low beam 22 are supplied with the voltage in such an order (FIG. 10($a$) and FIG. 10($b$)) and a lamp current (FIG. 10($c$)) at this stage. As previously explained, in the present embodiment, the lamps 21 through 28 are supplied with the voltage one after another in periodic fashion, which results, inevitably, in that no overlap occurs between two adjacent lamps in voltage supply. However, in the event of a delayed action of a switching transistor (i.e. the switching transistors T1 and/or T2 delay in action or operation) or other unexpected matters, the voltage supply to the low beam lamp 21 lasts and is brought into overlap state with the next voltage supply to the low beam lamp 22. At this time, the lamp current is made higher during the above voltage supply when compared to normal lamp current mode (cf. FIG. 10($c$)). Thus, when the lamp current which is being determined or watched at the current detection circuit portion 36 exceeds a predetermined threshold value Vth, a considerable overlap current is generated, while the current detection circuit portion 36 is equal to or less than the predetermined threshold value Vth no overlap current is generated.

At step 207, if a decision is made that no overlap current is found, the CPU 31 terminates the lighting-lamp procedure and goes back to step 102. On the other hand, if the overlap current is judged to exist, the CPU 31 goes to step 208 to set a dead band which will be detailed with reference to a time chart in FIG. 11. FIG. 11 exemplarily shows that the low beam 21 and the low beam 22 are supplied with the voltage in such an order (FIG. 11($a$) and FIG. ($b$)) and a lamp current (FIG. 11($c$)) at this stage. While the overlap current exists as shown in FIG. 11, if the dead band is expanded or increased between the voltage supply to the low beam lamp 21 and voltage supply to the low beam 22 by delaying the initiation of the voltage supply to the low beam 22 by a time duration Td, the overlap between the voltage supply to the low beam lamp 21 and voltage supply to the low beam 22 is reduced or is made shorter correspondingly to the time duration Td, which results in that the degree of the lamp current is decreased (cf. FIG. 11($c$)). That is to say, expanding the dead band by setting the time duration Td upon generation of the overlap current makes it possible to restrict the increase of the lamp current. Such an expansion of the dead band based on detecting the overlap current is made between voltage supplies to two adjacent lamps.

At step 201, if the anti-theft is found ON, the CPU 31 goes to step 209 to read the on/off time from the on/off pattern address which was set at step 110. Upon on-time, the value of criteria of PWM is supplied, as the output PWM, to one or more of the selected lamps, while upon off-time no voltage is supplied thereto. Thus, the lamps are flickered (i.e. each of the lamps go and off plural times), which makes it possible to inform the people of the theft-state of the vehicle.

As obvious from the foregoing described explanation in great detail, the present embodiment provides the following advantages.

(1) In the present embodiment, if the overlap current is generated between adjacent two of adjacent lamps 21 through 28 which results from the delayed action of one of the switching transistors T1 through T8, the time duration Td is set to expand the dead band between the voltage supply to one of the lamps and the subsequent voltage supply to the next lamp. The overlap voltage supply duration between the two adjacent lamps can be reduced correspondingly by the time duration Td, resulting in decreasing the lamp current. That is, setting such a time duration Td upon generation of the overlap current results in expanding the dead band, which restricts the lamp current to increase. Thus, restricting the generation of surge which accompanies the abrupt change of the lamp current is made possible and the possible electromagnetic noise upon voltage supply can be reduced.

(2) In the present embodiment, when the engine automatic stop control is made active, the time duration is made shorter in gradual fashion during which each of the lamps 21 through 28 is supplied with voltage, which causes it to dim each of the lamps 21 through 28 gradually without a feeling of wrongness and restrict the power consumption. In addition, the voltage supply time duration for each of the lamps 21 through 28 is sharply increased when the engine automatic start control is active, which makes it possible to ensure the suitable illumination of each of the lamps 21 through 28 when the vehicle is going to start.

(3) In the present embodiment, on the basis of the ambient brightness, the voltage supply time duration for each of the lamps 21 through 28 is controlled to increase or decrease. Thus, when in a bright environment, corresponding shortening the voltage supply time duration for each of the lamps 21 through 28 makes it possible to restrict the power consumption of the high voltage battery 11 without disturbing the visibility. In addition, on the basis of the vehicle speed, the voltage supply time duration for each of the lamps 21 through 28 is controlled to increase or decrease. Thus, when the vehicle speed is low, correspondingly shortening the voltage supply time duration for each of the lamps 21 through 28 makes it possible to restrict the power consumption of the high voltage battery 11 without disturbing the visibility. Moreover, on the basis of the voltage change or variation in the high voltage battery 11, when the voltage of the high voltage battery 11 drops, correspondingly extending the voltage supply time duration for each of the lamps 21 through 28 makes it possible to ensure suitable illumination of each of the lamps 21 through 28.

(4) In the present embodiment, when the vehicular theft mode is detected, even though the ignition switch is being turned off, the voltage supply is initiated to one or more of the lamps 21 through 28 to light, thereby effectively informing the people of the vehicular theft state.

(5) In the present embodiment, voltage supplies to the lamps 21 through 28, respectively, are made one after another (i.e. the timing of the voltage supply to one of the lamps differs from another). Thus, when compared to the concurrent voltage supplies to the lamps 21 through 28, the resultant in rush of current can be dispersed and the electromagnetic noise generated upon voltage supply can be restricted. In addition, the amounts of concurrently flowing currents are reduced, which results in that the cable can be made thinner, thereby reducing the mass of the vehicle ultimately.

(6) In the present embodiment, the PWM control of the voltage supply time duration for each of the lamps 21 through 28 makes it possible to employ the currently specified or rated lamps which operate on 12 volts, resulting in cost reduction in R & E when compared to a system employing lamps which operate on 36 volts. In addition, the production cost can be also reduced when compared to the voltage supply which is made such that 12 volt power supply is prepared by DC/DC conversion of 36 volts.

(7) In the present embodiment, the wires for supplying the voltages to the lamps are divided into two systems: one is for right-sided lamps, the other is for left-sided lamps. Thus, robust stability improvement can be established even if the voltage supply portion is in failure or malfunction.

Second Embodiment

Hereinafter, a second embodiment of a vehicular lamp control apparatus in accordance with the present invention will be described with reference to FIGS. 12 and 13. It is to be noted that the second embodiment is characterized by adding communication means including a cellular phone and its peripherals to the first embodiment. No explanations are made with respect to structures of the second embodiment which are similar to those of the first embodiment.

Figure 12:
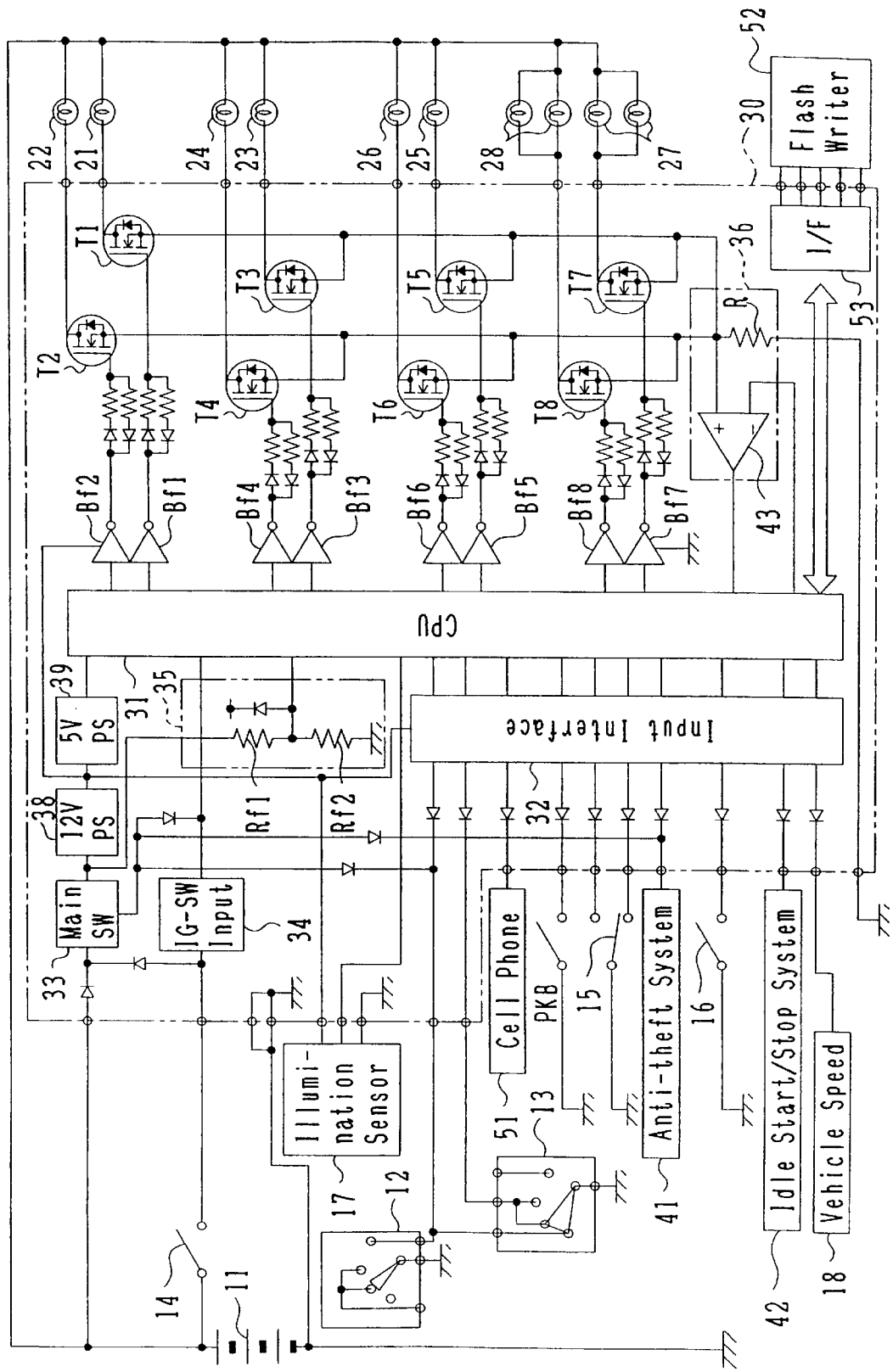
FIG. 12 illustrates an electric circuit diagram of a second embodiment of a vehicular lamp control apparatus in accordance with the present invention.

As shown in FIG. 12, a vehicular lamp control apparatus in accordance with the present embodiment includes a cellular phone 51 for receiving calling signals and identification information (such as cellular telephone number and password) from the owner's mobile communication device via cellular telephone network. The cellular phone 51 is coupled, by way of the input interface 32, to the CPU 31 to input thereto the identification of the mobile communication device which issues the calling signals.

The present vehicular lamp control apparatus also includes a flash writer 52 which is capable of accessing to the flash memory housed in the CPU 31 by way of an interface 53. This flash writer 52 is used, for example, to store the identification information of the user-owned mobile communication device in the flash memory. The flash writer 52 is also capable of storing a flicker pattern of each of the lamps 21 through 28 as will be detailed later to the flash memory when the calling signals are confirmed as legally or lawfully issued. Once the identification information or the flicker pattern is stored in the flash memory, the flash writer 52 can be removed. Thus, The CPU 31 can judge whether or not the calling is issued from a duly authorized user by comparing the mobile communication device identification information related to the calling signals received at the cellular phone 51 and the identification information of the user-owned mobile communication device which is stored in the flash memory.

Next, with reference to FIG. 13, contents of the operation executed by the CPU 31 and how the vehicular lamp control apparatus operates will be explained in great detail.

Figure 13:
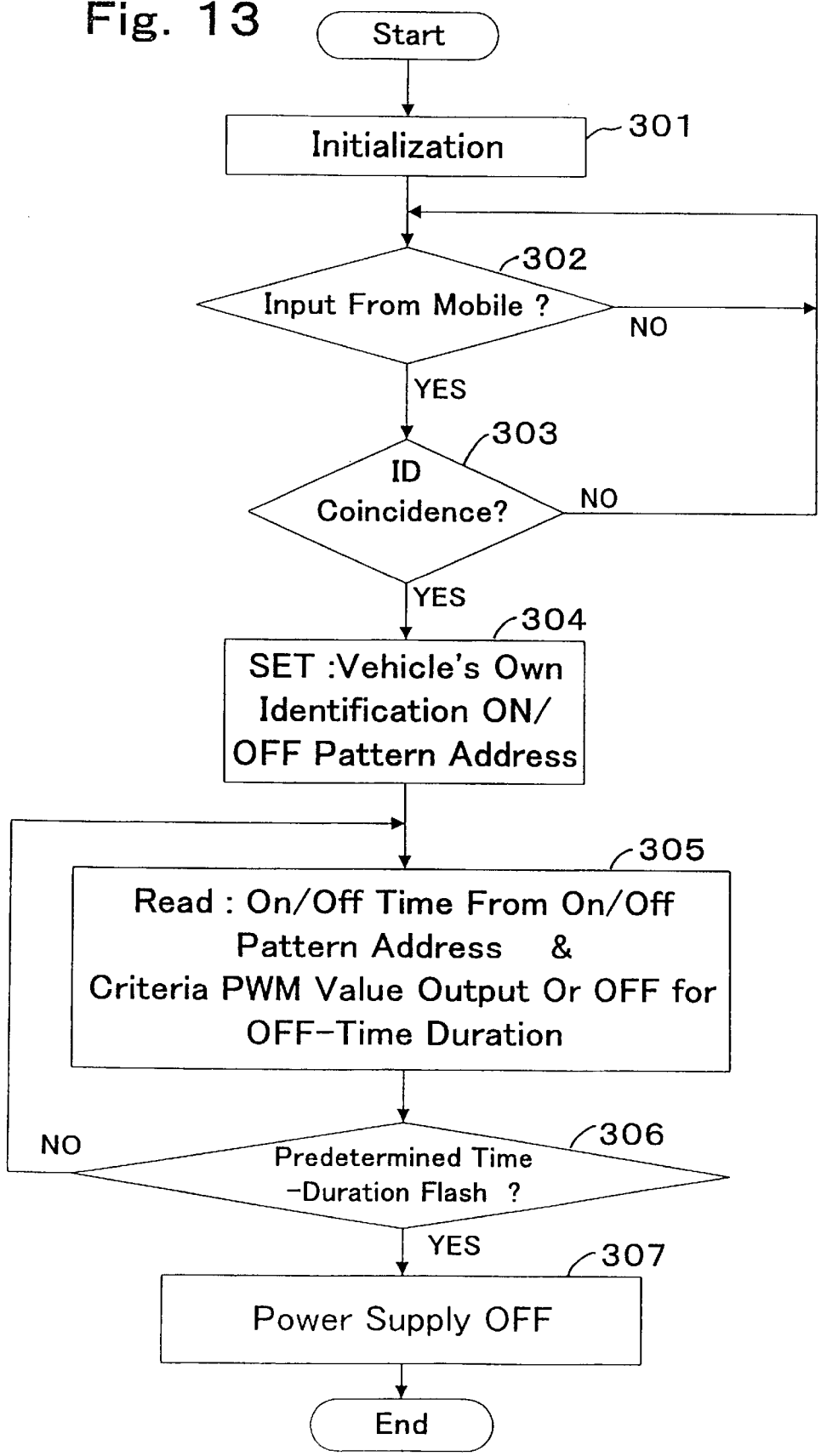
FIG. 13 is a schematic illustration, in flowchart format, of the control of the lamp control apparatus in accordance with the second embodiment.

In a routine which operates according to a flowchart depicted in FIG. 13, first of all, at step 301, the CPU 31 executes a necessity initialization and thereafter executes step 302 and successive steps.

At step 302, the CPU 31 checks whether or not an input from the mobile communication device exists. Receipt of the mobile communication device's calling signal at the cellular phone 51 and inputting the identification information of the mobile communication device establish a confirmation of the input from the mobile communication device. If the input from the mobile communication device is found to exist, the CPU 31 goes to step 303 to check whether or not the identification information of the mobile communication device is in coincidence with the identification information stored or registered in the flash memory.

At this time, if the identification information of the mobile communication device is found to be in coincidence with the identification information stored or registered in the flash memory, the CPU 31 determines that the calling comes from a duly pre-registered user and goes to step 304.

On the other hand, if the input from the mobile communication device is found not to exist or if the identification information of the mobile communication device is found not to be in coincidence with the identification information stored or registered in the flash memory, the CPU 31 goes back to step 302 and repeats successive steps.

At step 304, an on/off pattern address is set which informs a current position of the concerned vehicle or the vehicle on which the present lamp control apparatus is mounted. In detail, an on/off time is set in a specific address for intermittently turning on-and-off each of the lamps 21 through 20 which indicates a vehicular current position in pattern mode. Thereafter, the CPU 305 goes to step 305.

At step 305, the CPU 31 reads the on/off time from the on/off pattern addresses which was set at step 304. Upon on-time, the value of criteria of PWM is supplied, as the output PWM, to one or more of the selected lamps 21 through 28, while upon off-time no voltage is supplied thereto. Thus, the lamps are flickered (i.e. each of the lamps goes on and off plural times), which makes it possible to inform the public of the current position of the vehicle.

Next, the CPU 31 goes to step 306 to check whether or not the lamps flashing on-and-off based on this signal pattern continues for a predetermined time duration hereinafter. If the result is no, the CPU 31 goes back to step 305 to repeat the flash on-and-off. If the result is yes, the CPU 31 goes to step 307 to stop the power supply to each of the lamps 21 to 28 inclusive, thereby terminating further processing.

As described in great detail above, the present embodiment provides, in addition to the aforementioned first embodiment's advantages (1) to (7) inclusive, the following advantages or merits.

(1) In the present embodiment, the cellular phone 51 is provided to receive the identification information transmitted from the mobile communication device and when the resulting identification information is in coincidence with the previously stored identification information, the lamps 21 to 28 inclusive are powered in a predetermined mode even if the ignition key switch is being OFF, thereby flashing each of the lamps 21 through 28 on-and-off in a predetermined pattern. Thus, in a large parking area, sending identification information from the mobile communication device to the cellular phone 51 causes the lamps to flash on-and-off, which makes it possible to recognize easily where the vehicle is parked.

(2) In the present embodiment, after a predetermined time elapse, supplying the electric power to each of the lamps 21 through 28 is stopped to terminate the aforementioned patterned flashing of the lamps on-and-off. Thus, an extreme power consumption of the high voltage battery 11 can be prevented.

(3) In the present embodiment, the user's identification information can be rewritten in the flash writer 52.

Third Embodiment

Figure 14:
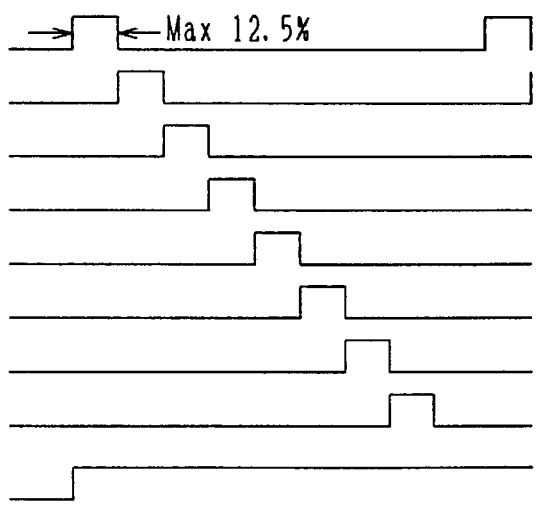
FIG. 14 illustrates a time chart of voltage supply to each of the lamps when the lamp control apparatus in accordance with a third embodiment operates.

A third embodiment of the present invention will be described hereinafter with reference to FIGS. 14 and 15. The third embodiment is identical with the first embodiment except in that a changing control is always made as to the turning-on timing of the lamps. Thus, the portions of the third embodiment similar to those of the first embodiment are not described in detail.

As previously mentioned, the electric power supplies from the high voltage battery 11 to the lamps 21 through 28 are made in different timings or one after another. When all the lamps 21 through 28 are lit as shown in FIG. 14, the flashing order is: the right-sided low beam lamp 21, the left-sided low beam lamp 22, the right-sided high beam light 23, the left-sided high beam light 24, the right-sided fog lamp 25, the left-sided fog lamp 26, the right-sided hazard lamp 27, and the left-sided hazard lamp 28. At this time, for the electric power supply period, the electric power supplies to the lamps 21 through 28 are substantially evenly made, resulting in that the current (detected as voltage value) which flows through each of the lamps 21 through 28 and which is detected at the current detection circuit portion 36 maintains a predetermined level, as shown in FIG. 14(*i*). Thus, possible surge generation can be restricted.

Figure 15:
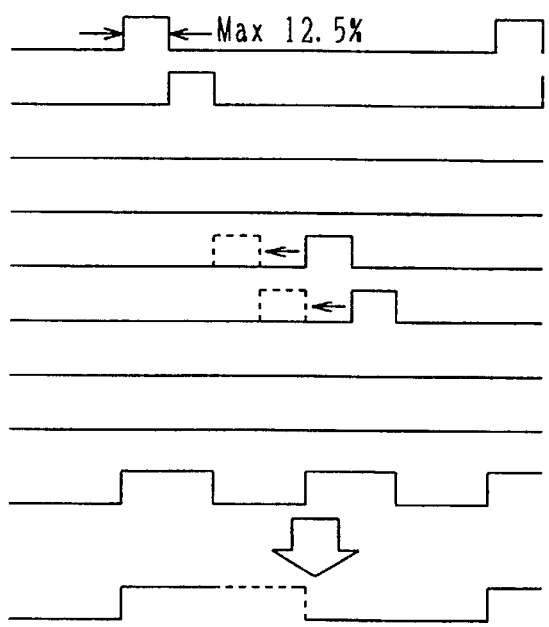
FIG. 15 illustrates another time chart of voltage supply to each of lamps when the lamp control apparatus in accordance with the third embodiment operates.

To the contrary, when only the low beam lamp 21, the low beam lamp 22, the fog lamp 25, and the fog lamps 26 are flashed on-and-off as shown in FIG. 15, the electric supply to each of the lamps becomes intermittent. At this time, as indicated in FIG. 15(*i*), the current which flows through each of the lamps 21, 22, 25, and 26 and which is detected at the current detection circuit portion 36 begins to repeatedly increase and decrease in a relatively short cycle. Thus, the surge occurs frequently in such a short cycle, thereby generating electromagnetic noise frequently.

In the present embodiment, the CPU 31 is designed to detect such the intermittent electric power supply to each of the lamps. In detail, the CPU 31 can detect the intermittent electric supply to each of the lamps with reference to the on-off condition (flag) of each of the switches 12, 13, 15, and 16, for example, and the electric power supply timing in normal order to each of the lamps 21 through 28.

If the CPU 31 detects an intermittence, the electric power supply timings to the lamps 21 through 28 are adjusted in order not to cause the intermittence. In detail, as indicated in FIGS. 15(*e*) and (*f*), a shift is made to the wave-line indicated timing so that the electric power timing of the fog lamp 25 (26) is made continues to the electric power timing of the low beam lamp 21 (22). Such a shift of the electric power supply timing (shift control) makes it possible to perform, within the power supply cycle T, the electric power supply to the lamps successively or without interruption. Thus, as can be seen from FIG. 15(*j*), the increase and decrease frequency of the current can be reduced as small as possible which flows through each of the lamps 21 through 28 and which is detected at the sole current detection circuit portion 36. Thus, the possible surge generation frequency which results from increasing-and-decreasing the lamp current can be reduced, thereby decreasing the electromagnetic noise upon electric power supply.

Though the above-described shift control is made with reference to the example wherein only the low beam lams 21 and 22 and the fog lamps 25 and 26 are lit, such a shift control can be applied to an arbitrary lamp combination when at least one of the lamps 21 through 28 is not lit.

As detailed above, the present embodiment provides, in addition to the advantages provided by the first embodiment, the following advantage or merit.

(1) In the present embodiment, the timing of electric power supply to the lamp is shifted in order to restrict the intermittent electric power supply to each of the lamps 21 through 28. Thus, corresponding to the intermittence restriction, the possible surge generation frequency which results from increasing-and-decreasing the lamp current can be reduced, thereby decreasing the electromagnetic noise on the electric power supply.

Fourth Embodiment

Hereinafter, a fourth embodiment of the present invention will be described with reference to FIGS. 16 and 17. The present embodiment is to improve turning-on of each of the lamps 21 through 28 in each of the first, second, and third embodiments in such a manner that if a specific lamp and/or a driving circuit (including a switching transistor) for the specific lamp is found to be broken and malfunction, respectively, another lamp is lit instead of the specific lamp. Other portions of the present embodiment are identical with those in each of the first, second, and third embodiments and is not described in detail.

Figure 16:
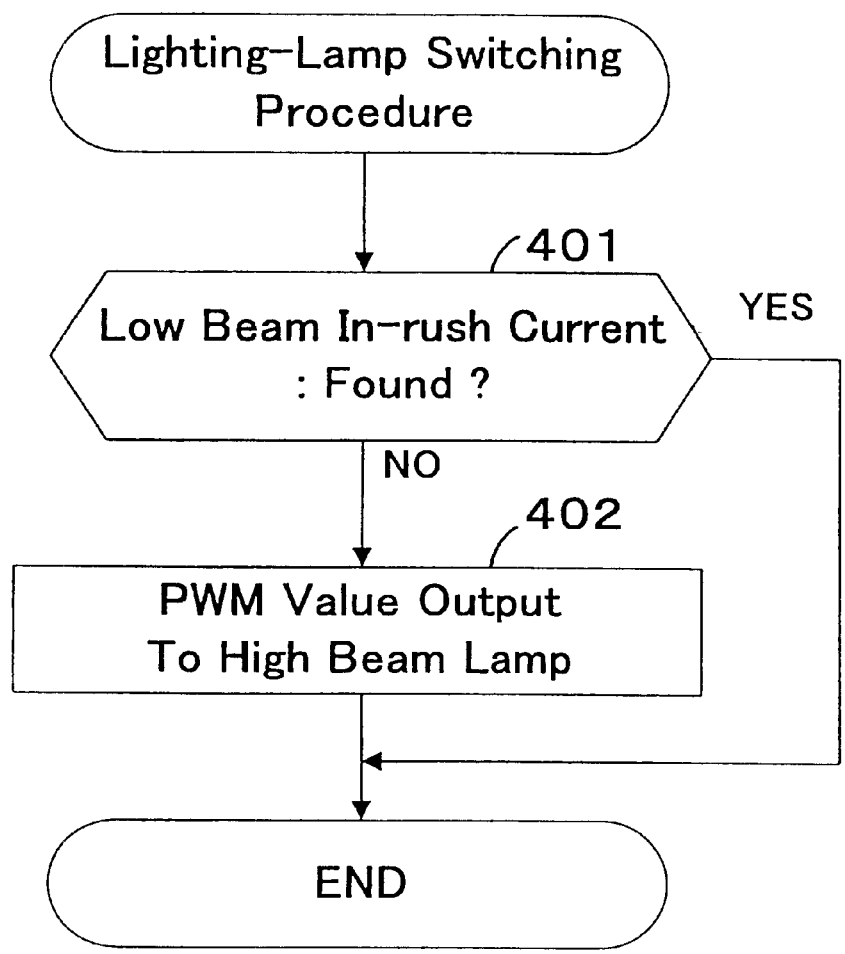
FIG. 16 is an illustration, in flowchart format, of the control of the lamp control apparatus in accordance with a fourth embodiment of the present invention.

A routine according to a flowchart shown in FIG. 16 is initiated when an initial PWM output is made to each of the low beam lamps 21 and 22 (i.e. when the first ON of the head flag). At an initial stage of the electric power supply to each of the lamps 21 and 22, due to lower temperature, the filament of each lamp is low in electric resistance and therefore the lamp current has a characteristic which is larger than usual so long as the electric power supply to each of the lamps 21 and 22 is normal, as shown in FIG. 17. In view of such characteristics, the foregoing timing initiation is employed for detecting the malfunction in electric power supply to each of the lamps 21 and 22.

Immediately when this routine is initiated, the CPU 31 checks whether or not an inrush of current is found at each of the low beam lamps 21 and 22 upon supply of electric power thereto. With respect to the timing of the electric power supply to each of the low beam lamp 21 and 22, the CPU 31 compares the lamp current detected at the current detection circuit portion 36 to the threshold value Vth1 to check whether or not the electric power supply to each of the low beam lamps 21 and 22 is in normal.

If an inrush of current is found, the CPU 31 understands that the inrush of current indicates the initial characteristic when the electric power supply to each of the low beam lamps 21 and 22 is made successfully or normally, thus regards that the lamps 21 and 22 are normal, and does no further proceedings.

To the contrary, if no inrush of current is found, the CPU 31 regards that no initial characteristics are found which appear when the electric power supplies to the respective low beam lamps 21 and 22 are normal, judges that an abnormal electric power supply occurs in at least one of the electric power supplies to the respective low beam lamps 21 and 22, and goes to step 402.

At step 402, the electric power supply is made to the high beam lamp 23 (24) instead of the malfunction-found low beam lamp 23 (24). In detail, if the head flag is made ON which causes the low beam lamp 21 (22) to turn on, it automatically makes the high flag ON which causes the high beam lamp 23 (24) to turn on. Thus, when an attempt is made for turning on the malfunction-found low beam lamp 21 (22), the high beam 23 (24) is automatically lit or turned on.

In the present embodiment, the head flag causes the right-side low beam lamp 21 and the left-side low beam lamp 22 to turn on concurrently, while the high flag causes the right-side high beam lamp 23 and the left-side high beam lamp 23 to turn on concurrently. Instead, head flags can be prepared for turning on the right-side low beam lamp 21 and the left-side low beam lamp 22, respectively, while high flags can be prepared for turning on the right-side high beam lamp 23 and the left-side high beam lamp 24, respectively. In such a concept, if only the low beam lamp 21 (22) is found to be malfunctioning, only the high beam lamp 23 (24) can be, instead, turned on or lit.

Alternatively, instead of turning on the high beam lamp 23 (24), the fog lamp 25 (26) may be turned on or lit when the low beam lamp 21 (22) is found to malfunction. In addition, in the plural lamps 21 through 28, which lamp should be turned on or lit can be arbitrary set when one of the lamps is malfunctioning.

As explained in great detail, the present embodiment provides the following advantage or merit, in addition the advantages (1) through (7) derived from the first embodiment.

(1) In the present embodiment, if one or more of the plural lamps 21 through 28 are found to be malfunctioning in electric power supply thereto, one or more other lamps are turned-on or lit, thereby coping with the emergency.

It is to be noted that the present invention is not restricted to the above-described embodiments and other embodiments can be established as follows.

Figure 18:
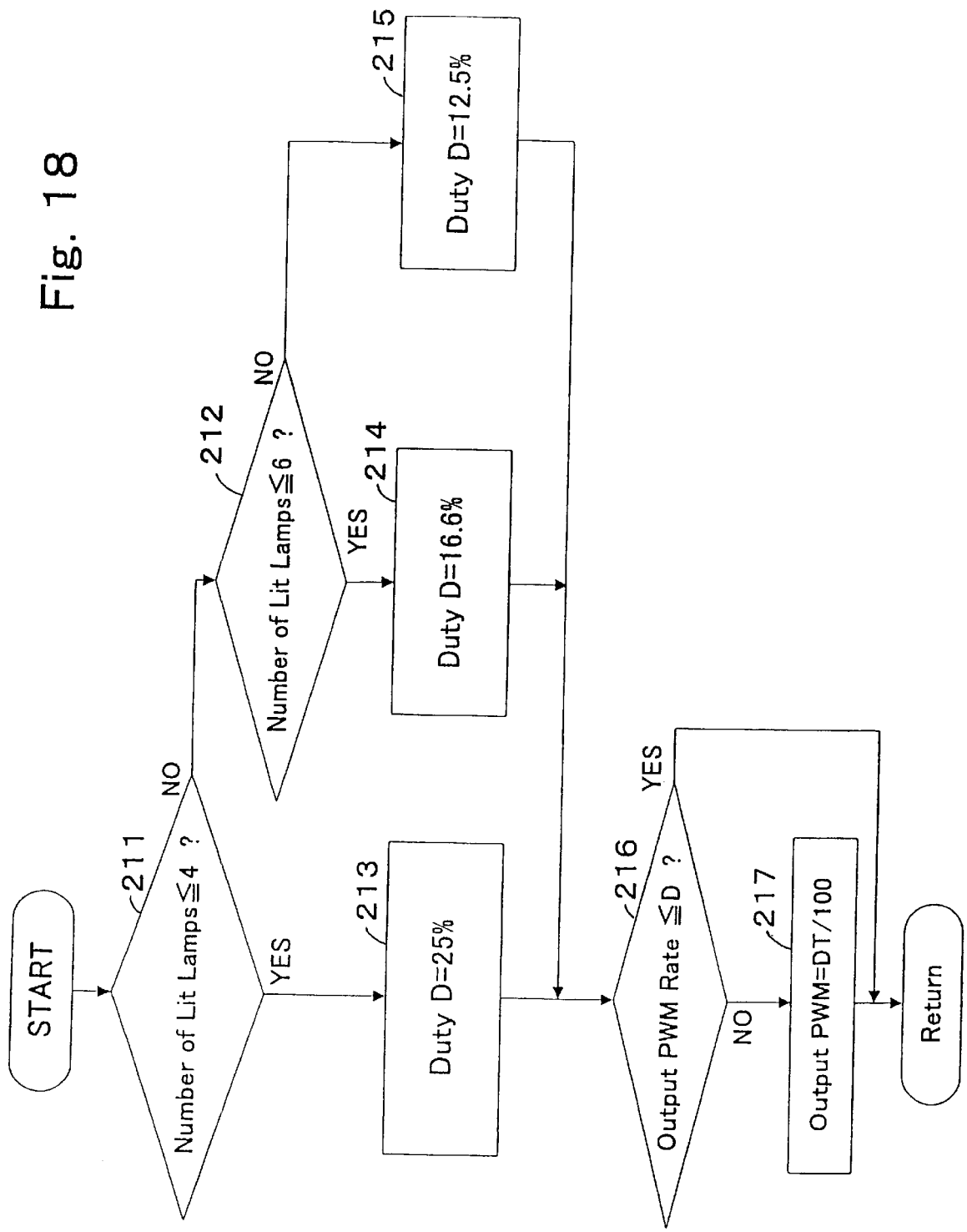
FIG. 18 is an illustration, in flowchart format, of the control of the lamp control apparatus in accordance with a first alternative of the first embodiment of the present invention.

The output PWM upper limit processing at step 204 in the first embodiment can be performed in the form of a subroutine shown in FIG. 18. In detail, in this output PWM upper limit processing subroutine, the CPU 31 checks at step 211 whether or not the number of the lamps which are lit currently is equal to or below 4. This process can be made by counting the number of the flags which are ON for turning on the respective lamps.

If the number of the currently turned-on or lit lamps is found to exceed 4, the CPU 31 goes to step 212. If the number of lit lamps is 4 or less the CPU goes to step 213. At step 213, the rate of the upper limit of electric power supply to each of the lamps 21 through 28 relative to the cycle T (which is refereed to as duty D) is set to be 25% ($=\frac{1}{4}\times 100$).

On the other hand, the CPU 31 at step 212, checks whether or not the number of the lamps to be lit is equal to or below 6. If the result is in excess of 6, the CPU 31 goes to step 215, otherwise the CPU 31 goes to step 214.

At step 214, the CPU 31 sets the duty D to 16.6% ($=\frac{1}{6}\times 100$), while at step 215 the CPU 31 sets the duty D to 12.5% ($=\frac{1}{8}\times 100$).

Figure 19:
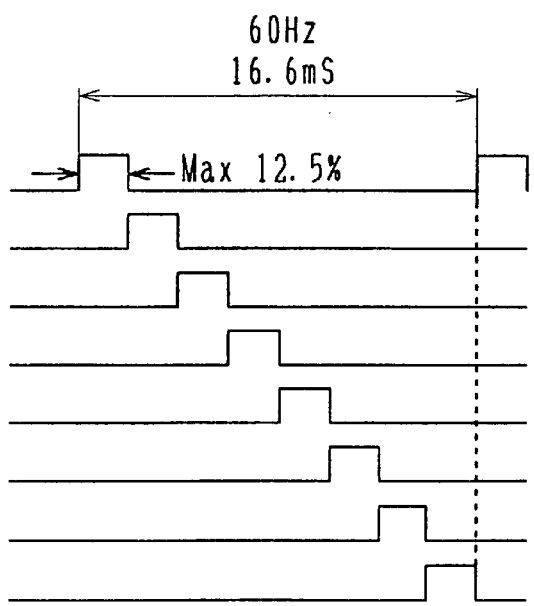
FIG. 19 is a time chart of voltage supply to each of the lamps when the lamp control apparatus in accordance with the first alternative of the first embodiment operates.
Figure 20:
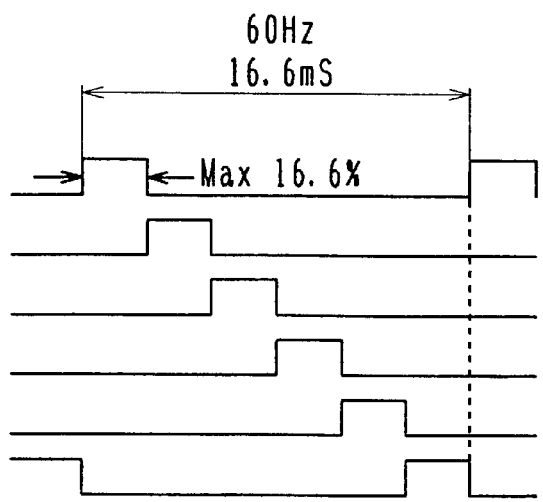
FIG. 20 is anther time chart of voltage supply to each of the lamps when the lamp control apparatus in accordance with the first alternative of the first embodiment operates.

The foregoing processing at each of steps 211 to 215 inclusive is intended to set a suitable output PWM upper limit depending on the number of lit lamps. In detail, if the number of the lit lamps is smaller, a corresponding increase in the upper limit of electric power supply is made for increasing the possible or permitted electric power supply amount. FIGS. 19 and 20 indicate time-charts when the number of lit lamps is 8 and 6, respectively. Making the duty D to increase as the number of lit lamps decrease causes the permitted electric power supply range to increase.

The CPU 31, after executing any one of steps 211 to 215 for setting the duty D, compares the rate relative to the cycle T of the output PWM which is calculated at step 203 to the above-mentioned duty D (the upper limit of the electric power supply time duration). If the output PWM rate is equal to or below the above duty D, the output PWM is set to be final. Otherwise, the output PWM is replaced with a new one i.e. an electric power supply time duration corresponding to the duty D. Such an amendment or correction of the upper limit (duty D) of the electric power supply time duration can cope, in flexible fashion, with a control in which longer electric power supply to each lamp is requested, in addition to the aforementioned advantages (1) to (7) inclusive.

Figure 21:
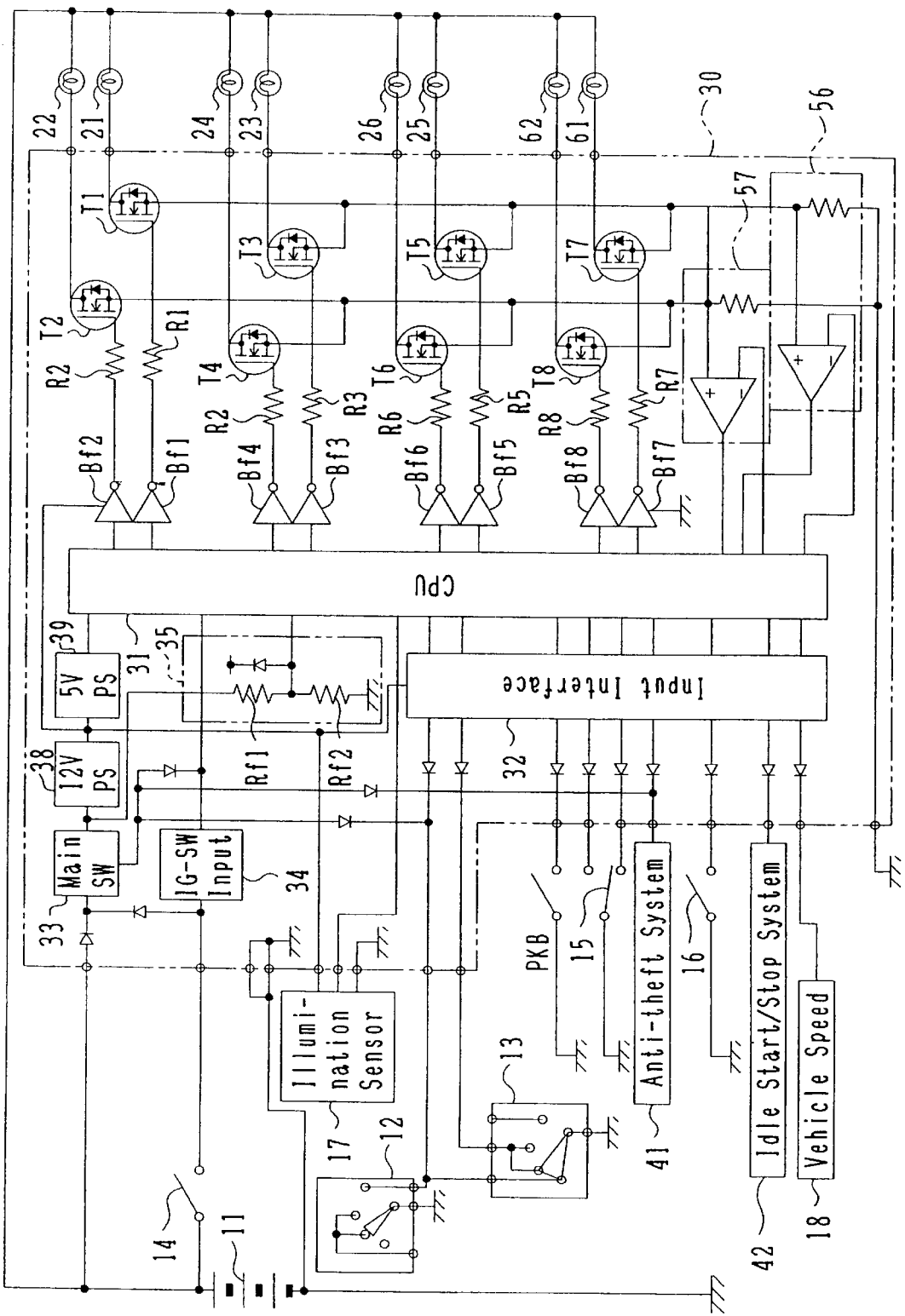
FIG. 21 illustrates an alternative of the electric circuit diagram illustrated in FIG. 1.

In the aforementioned first embodiment, the current flowing through each of the lamps 21 through 28 is detected by the common or sole current detection circuit portion 36. Alternatively, as shown in FIG. 21, a first current detection circuit portion 56 and a second current detection circuit portion 57 are available which detect the current flowing through the right-side lamps 21, 23, 25, and 61 and the current flowing through the left-side lamps 22, 24, 26, and 62, respectively. Such a structure enhances the robustness for lamp current detection, in addition to the advantages (1) to (7) inclusive which are derived from or provided from the first embodiment. Though in FIG. 21 right and left cornering lamps 61 and 62 are provided instead of the hazard lamps 27 and 28, similar advantages can be provided even if the hazard lamps 27 and 28 are used.

Figure 22:
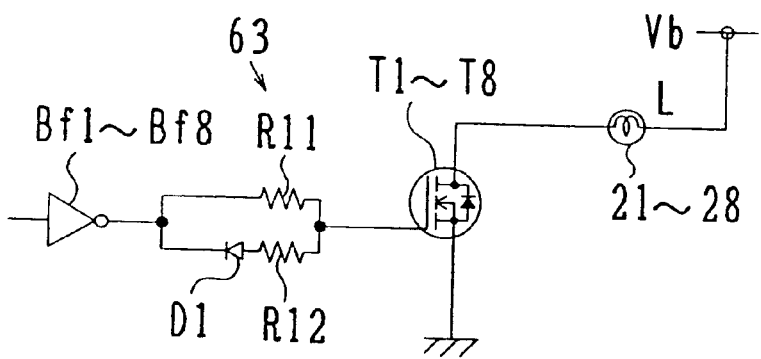
FIG. 22 illustrates another alternative of the electric circuit diagram illustrated in FIG. 1.

In the aforementioned first embodiment, the resistors R1 through R8 are interposed between the output buffers Bf1 through Bf8 and the gates of the switching transistors T1 through T8, respectively. To the contrary, as shown in FIG. 22, between the output buffers Bf1 through Bf8 and the gates of the switching transistors T1 through T8, a circuit 63 can be interposed which is constructed in such a manner that a series circuit of a resistor R12 and a diode D1 is connected to a resistor R11 in parallel. The resistor R11 is of a relatively high value, for example, 11 kΩ, while the resistor R12 is of a relatively low value, for example, 1 kΩ. The forward direction of the diode D1 is at the side of each of the output buffers Bf1 through Bf8.

In such a structure, when feeding signals to the respective gates of the switching transistors T1 through T8 begins, due to the fact that each of the signals passes through the resistor R11, the signal at each gate increases gradually depending on the higher value of the resistor R11 (cf. FIGS. 23(a) and (b)), while if the signal outputs to the gates of the switching transistors T1 through T8 via the circuit 63 are terminated, due to the fact that the signal at each gate decreases quickly depending on the lower value of the resistor R12. However, the slope of the signal decrease is gentle or smooth due to off-time action delay of each of the switching transistors T1 through T8 (MOSFE) (cf. FIGS. 23(a) and (b)). Setting the resistors R11 and R12 to suitable values makes it possible to obtain a characteristic wherein the output signal to the gate upon initiation and the output signal to the gate upon termination are symmetric with each other. Making the shapes of the output signals to the gate to establish such a characteristic brings in that between two adjacent lamps (in FIG. 23, these lamps are the low beam lams 21 and 22) overlap currents between the lamps are cancelled, thereby making the electric power supply even or substantially uniform in substantial. Thus, the possible surge when the lamp current increases or decreases, thereby reducing the electromagnetic noise upon the electric power supply.

In the second embodiment, the cellular phone 51 as the communication means can be replaced with a PHS, a PDA, a pocket bell, a other similar handy devices. When the owner is licensed to use a specific communication band area, a cellular receiver is also available which can receive the identification information by not using the public communication network.

In the foregoing fourth embodiment, when the lamp is found to be broken and/or when the driving circuit (including the switching transistor) for driving the lamp is found to malfunction, another or alternative lamp is lit by lamp switching control. In such a switching control, the alternative lamp may be selected, in priority manner, from other lamps such that the selected lamp is similar to the lamp at issue in power consumption. Setting the priority can be made previously in the routine to be executed by the CPU 31. For example, a setting can be made such that when the low beam lamps 21 and 22 are in malfunction, the fog lamps 25 and 26 can be alternatively turned on or lit, respectively.

In addition, when one or both of the high beam lamps 23 and 24 are turned on instead of one or both of the low beam lamps 21 and 22 which are in malfunction, adjusting one or both of the high beam lamps 23 and 24 in the amount of electric power supply (i.e. electric power supply time duration) is available in order to equalize the low beam lamp 21 (22) and the high beam lamp 23 (24) in power consumption power.

In the foregoing fourth embodiment, when the lamp is found to be broken and/or when the driving circuit (including the switching transistor) for driving the lamp is found to be malfunctioning, another or alternative lamp is lit by lamp switching control. Instead or in addition thereto, storing and/or indicating the diagnostic results are available.

As examples of the anti-theft system 41 which is employed in each of the embodiments, the following can be available: a system which becomes active when an unlawful opening is made on a door or a bonnet or hood, a system which is made active resulting from an authorized person's approach to the vehicle which is recognized by a human detection sensor utilizing the electrostatic capacitance change, a system which is mace active when the vehicle is moved against nature or abnormally, and so on.

Additionally, an SOS switch, as a secondary or simpler type anti-theft device, can be provided which issues a signal to the CPU 31. The SOS switch is designed to be turned on by the driver's will or intention and makes the lamps 21 through 28 flash on-and-off intermittently, especially, to denote an SOS signal. Providing such an SOS switch serves as an emergency alarm to the outside environment.

It is to be noted that providing a flash writer which is similar to that in the second embodiment makes it possible to change at will the flashing on-and-off pattern when the vehicle is found to be in danger of theft or the SOS switch is turned on.

In each of the embodiments, when a new electric power supply is initiated to each of the lamps 21 through 28, the amount of electric power to be supplied to the lamp can be increased in a gradual manner to establish a slow start lighting of the lamp. In such a case, only the high beam lamps 23 and 24, the slow start time duration during which the electric power for the supply increases can be set shorter. Only each of the high beam lamps 23 and 24, the slow start time duration during which the electric power for the supply increases can be set at will or arbitrary. Like the second embodiment, employing the flash writer 52 makes it possible to rewrite the slow start time duration.

In each of the foregoing embodiments, a structure can be employed in which when the dimmer switch 13 is turned on the low beam lamps 21 and 22 are lit and concurrently the filaments of the respective high beam lamps 23 and 24 are placed in a pre-heated condition.

In each of the foregoing embodiments, while the engine's automatic control is active, the high beam lamps 23 and 24 or the fog lamps 25 and 26 may be turned off automatically.

In each of the foregoing embodiments, when the voltage of the high voltage battery 11 becomes lower which is detected at the voltage detection circuit portion 35, a structure may be employed in which the number of the lit lamps is made smaller when there is a voltage drop of the high voltage battery 11.

In each of the foregoing embodiments, depending on the number of the lit lamps, the duty D of the PWM control can be adjusted as shown in FIG. 18 (steps 211 to 215 inclusive).

In each of the foregoing embodiments, two electric power-feeding lines are provided: one is for the right-side lamps and the other is for the left-side lamps. Instead, for example, it is possible to constitute two power feeding lines in such a manner that one is for the low beam lamps 21 and 22 and the other is for the high beam lamps 23 and 24. In addition, it is possible to establish that in case of failure of the former feeding line, supplying the electric power can be switched to the latter feeding line. The lamp combination belonging to each of the feeding lines is arbitrary. In such a case, a satisfactory coping with a failure in power feeding to one of the lamps can be established.

The invention has thus been shown and description with reference to specific embodiments or alternatives, however, it should be understood that the invention is in no way limited to the details of the illustrates structures but changes and modifications may be made without departing from the scope of the appended claims.

What is claimed is:

1. A vehicular lamp control apparatus comprising:

a high voltage battery; and a plurality of lamps, the lamps being supplied with voltages, respectively, from the high voltage battery in periodic fashion, an amount of the voltage supplied to each of the lamps being controlled by adjusting a time duration during which each of the lamps is supplied with the corresponding voltage by PWM control, characterized in that when an automatic engine stop control becomes active the time duration for the lamp is gradually decreased and /or when an automatic engine start control becomes active the time duration for the lamp is drastically increased.

2. A vehicular lamp control apparatus comprising:

a high voltage battery;

a plurality of lamps, the lamps being supplied with voltages, respectively, from the high voltage battery one after another in periodic fashion, an amount of the voltage supplied to each of the lamps being controlled by adjusting a time duration during which each of the lamps is supplied with the corresponding voltage by PWM control; and a single detecting circuit for detecting the amount of a current flowing through each of the lamps;

wherein when the single detecting circuit detects the amount of the current flowing through the lamps exceeds a threshold value, a dead band between the lamps to which the voltage is supplied in series at the corresponding time duration is expanded.

3. A vehicular lamp control apparatus as set forth in claim 2, wherein supplying the voltages to the respective lamps is made in different order for reducing the supplying voltage variation.

* * * * *